(12) United States Patent
Gyenes et al.

(10) Patent No.: US 9,784,589 B1
(45) Date of Patent: Oct. 10, 2017

(54) ELECTRONIC ROUTE NAVIGATION METHOD IN A ROAD NETWORK ON A MAP

(71) Applicant: AdasWorks Kft., Budapest (HU)

(72) Inventors: Viktor Gyenes, Budapest (HU); Peter Fenyvesi, Budapest (HU); Laszlo Kishonti, Budapest (HU)

(73) Assignee: AIMOTIVE KFT, Budapest (HU)

( * ) Notice: Subject to any disclaimer, the term of this patent is extended or adjusted under 35 U.S.C. 154(b) by 0 days.

(21) Appl. No.: 15/353,505

(22) Filed: Nov. 16, 2016

(51) Int. Cl.
*G01C 21/34* (2006.01)
*G06F 17/30* (2006.01)
*G09B 29/00* (2006.01)

(52) U.S. Cl.
CPC ..... *G01C 21/3461* (2013.01); *G01C 21/3407* (2013.01); *G01C 21/3446* (2013.01); *G06F 17/30241* (2013.01); *G09B 29/00* (2013.01)

(58) Field of Classification Search
None
See application file for complete search history.

(56) References Cited

U.S. PATENT DOCUMENTS

| | | | | | |
|---|---|---|---|---|---|
| 5,272,638 | A * | 12/1993 | Martin | ............... | G01C 21/3446 340/990 |
| 9,222,786 | B2 * | 12/2015 | Witmer | ............... | G01C 21/32 |
| 2010/0153005 | A1 * | 6/2010 | Cerecke | ............... | G01C 21/3446 701/533 |
| 2011/0087425 | A1 * | 4/2011 | Deng | ............... | G01C 21/32 701/532 |
| 2012/0158299 | A1 * | 6/2012 | Cerecke | ............... | G01C 21/3446 701/533 |
| 2013/0096815 | A1 * | 4/2013 | Mason | ............... | G01C 21/00 701/400 |
| 2013/0204524 | A1 * | 8/2013 | Fryer | ............... | G01C 21/3407 701/527 |
| 2013/0297207 | A1 * | 11/2013 | Mason | ............... | G01C 21/3407 701/533 |
| 2016/0238457 | A1 * | 8/2016 | Leighton, II | ............... | G01K 1/026 |

FOREIGN PATENT DOCUMENTS

WO 2016/051316 A1 4/2016

* cited by examiner

*Primary Examiner* — Russell Frejd
(74) *Attorney, Agent, or Firm* — Young & Thompson

(57) ABSTRACT

An electronic route navigation method is used in navigating an autonomous vehicle in a road network. In an implementation of the method a map is stored on at least one computer, and is sectioned into quads by a processor. The smallest size quads are grouped as base level quads. Extended area quads are defined to contain the area of a plurality of base level quads. Thereafter, a route along a road is calculated from a start point to a destination point. Further extended area quads on the map that do not contain the start point or the destination point are used for cross routing. In said cross routing only the road routes crossing the extended area quad leading from the start point to destination point are calculated.

27 Claims, 20 Drawing Sheets

ELECTRONIC ROUTE NAVIGATION METHOD IN A ROAD NETWORK ON A MAP

FIELD OF THE INVENTION

The present disclosure relates to navigation techniques, and more particularly to navigation techniques for autonomous vehicles.

BACKGROUND OF THE INVENTION

Advancement in the field of navigation has made it possible to operate vehicles, such as a car or a truck, in an autonomous manner. Such vehicles which operate in an autonomous manner are interchangeably referred to as autonomous vehicles. An autonomous vehicle requires an initial user input for navigating a particular route. The initial user input may include location coordinates of a starting point and a destination point. On receiving the user input, the autonomous vehicle typically accesses a map service through an onboard computing device. The onboard computing device may include for example, a navigation system or a mobile device, and requests for a route for traversing from the starting point to the destination point.

Generally, file size of such maps or routes is significantly large and usually poses inconvenience during downloading. Such downloading issue becomes prominent especially in areas with lower network connectivity. Failure to load the route and/or map successfully may result into adverse conditions. For instance, misdirection of the autonomous vehicle may occur which could pose a threat to safety of people around the autonomous vehicle as well as to the autonomous vehicle.

Transmitting map data images in a limited bandwidth environment has already been disclosed in Chintakindi et al., WO 2016051316 A1. This document is cited here as reference.

However, the prior art is deficient in techniques that would reduce the amount of information related to a route which an autonomous vehicle traverses.

SUMMARY OF THE INVENTION

It is an object of the invention to address and improve the aforementioned deficiency in the prior art.

It is an object of the invention to provide efficient navigation systems and methods for facilitating navigation of autonomous vehicles. The navigation system and methods presented herein provides for efficient loading of data related to the map and/or route which the autonomous vehicle traverses when travelling from a start point to a destination point.

In this application, the autonomous vehicle is essentially a car, a truck, any two-wheeled or four-wheeled vehicle, a quadcopter or a drone. The autonomous vehicle is configured for applications such as, traffic control, etc. The autonomous vehicle primarily transports people and objects with or without a driver. That is, a self driving car is understood to be an autonomous vehicle. Also a car that is self-driving in some situations, but driven by a human driver in other situations, is understood to be an autonomous vehicle in this application.

An electronic route navigation method used in navigating an autonomous vehicle in a road network, characterised in that, a map is stored on at least one computer, and is sectioned into tiles by a processor, the smallest size tiles are grouped as base tiles, extended area tiles are defined to contain the area of a plurality of base tiles, a route along a road is calculated from start point A to destination point B, extended area tiles on said map that do not contain point A or point B are used for cross routing, in said cross routing only the road routes crossing said extended area tile leading from point A to point B are calculated.

An electronic route navigation system used in navigating an autonomous vehicle in a road network, characterised in that, a map is stored on at least one computer, and is sectioned into tiles by a processor, the smallest size tiles are grouped as base tiles, extended area tiles are defined to contain the area of a plurality of base tiles, a route along a road is configured to be calculated from start point A to destination point B, extended area tiles on said map that do not contain point A or point B are configured to be used for cross routing, in said cross routing only the road routes crossing said extended area tile and leading from point A to point B are configured to be calculated.

An electronic route navigation software program used in navigating an autonomous vehicle in a road network, characterised in that, a map is stored on at least one computer, and is sectioned into tiles by a processor, the smallest size tiles are grouped as base tiles, extended area quads are defined to contain the area of a plurality of base tiles, a route along a road is calculated from start point A to destination point B, extended area tiles on said map that do not contain point A or point B are used for cross routing, in said cross routing only the road routes crossing said extended area tiles leading from point A to point B are calculated.

A tile may have any area ratio between levels, for example 2, 3, 4, 5, 6, 7, 8, 9 and so on. A quad has a area ratio of four, i.e. the area of a higher level quad is 4 times larger than the tile on a level underneath it.

The invention has sizable advantages. The invention results in efficient loading of data related to maps and/or routes used for facilitating navigation of autonomous vehicles. For instance, when the autonomous vehicle is in a region which is its start point or its destination point, detailed information related to the region is loaded. For example, details of road segments, road blocks, turn restrictions, and the like, may be loaded. However, when the autonomous vehicle is sufficiently far from the start point or the destination point, high level quads including less information is received. The high level quads include road routes which are used for cross routing. Thus, efficient loading of data related to a route being traversed by the autonomous vehicle is achieved.

The best mode of the invention is considered to be an autonomous car that receives base level map quads with high level of details from a cloud computer server when the autonomous car is near a start point or a destination point of its journey. When midway in the journey, far from both the start and the destination point, the autonomous car uses extended area map quads with a lower geographic information density for navigation in the best mode.

Some of the embodiments are described in the dependent claims.

DETAILED DESCRIPTION OF EMBODIMENTS

The present disclosure provides an electronic navigation method for facilitating navigation in autonomous vehicles. An autonomous vehicle is essentially a vehicle, for example, a car, a truck, and/or any two-wheeled or four-wheeled vehicle, capable of navigating along a predefined route without a driver. For navigating along the predefined route, the autonomous vehicle may use a map. The autonomous vehicle may be used for transporting people and/or objects along the predefined route. In accordance with the principles of the present subject matter as described herein, efficient loading of maps is achieved.

Figure 1A:
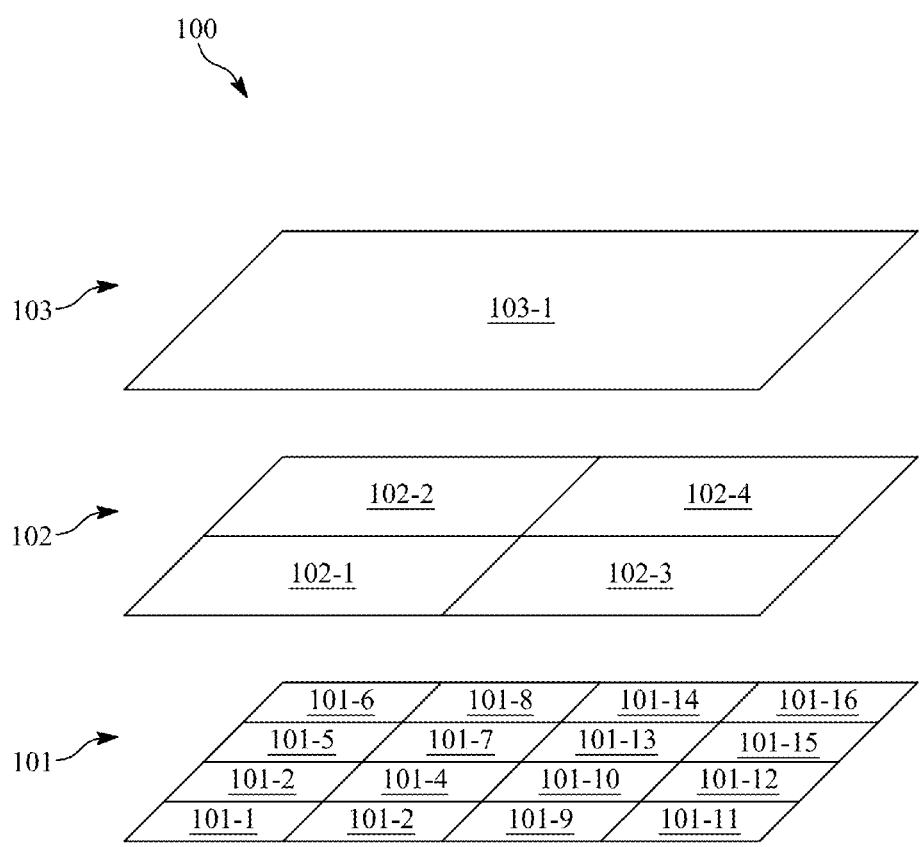
FIG. 1A demonstrates an embodiment 10 of a data structure for storing maps used for navigation of autonomous vehicles, in accordance with the invention as a diagram.

FIG. 1A demonstrates an embodiment 10 of a data structure 100 for storing maps used for navigation of autonomous vehicles. The data structure 100 comprises a plurality of levels arranged in a hierarchy. Each level from the plurality of levels in the hierarchy covers same area. However, amount of information stored in each level in the hierarchy may vary. In an example, the hierarchy is of a manner such that a top most level in the plurality of levels includes least amount of information, whereas a bottom most level in the plurality of levels comprises maximum amount of information. The bottom most level in the plurality of levels is interchangeably referred to as a base level herein. In an example, for a given region, the topmost level may include information related to suburbs and the major landmarks of the region. For the same region, the base level may include detailed information, for example, details related to road segments, turn restrictions, road blocks, and the like.

Further, each of the plurality of levels comprises at least one quad. A quad may be understood as a region in the level comprising at least a portion of the information stored in the level. For instance, the topmost level may include only one quad, whereas the base level may include a plurality of quads. As may be gathered, going from the bottom most level to the top most level, the data is pruned in a manner such that quads of the upper level cover larger areas. This, in turn, reduces the volume of data which is to be loaded when navigating an autonomous vehicle using maps stored in accordance with the data structure presented herein.

For the sake of brevity, only three levels are shown in the FIG. 1A, however, it may be noted that the data structure 100 may comprise a minimum of two levels (levels 0 to 1) and an unlimited maximum of levels. In an example, the data structure may include a maximum of sixteen levels (levels 0 to 15).

As shown in the FIG. 1A, the data structure 100 comprises levels 101, 102, and 103, where the level 101 is the base level and the level 103 is the topmost level. The level 101 comprises quads 101-1 to 101-16. The level 102 comprises quads 102-1 to 102-4. The level 103 comprises a single quad 103-1. In an example, the quads present in the base level are referred to as base level quads, and the quads present in levels other than the base level are referred to as extended area quads. Thus, quads 101-1 to 101-16 are the base level quads, while the quads, 102-1 to 102-4 and the quad 103-1 are the extended area quads.

In an example, a hierarchical relation may exist between the base level quads and the extended area quads. For instance, the base level quads are related to the extended area quads in a manner as depicted below in equation 1:

$$\text{Extended area quad level}(n) = 4^n * \text{Base level quads} \quad (1)$$

As an example, for level 2, i.e., the level 103 in the FIG. 1A, number of base level quads as per the equation 1 is 16.

In an example, when moving from the base level to the topmost level, each level may include less information than the level underneath. For instance, the level 102 includes less information than the level 101 and the level 103 includes less information than the level 102. Storing of the data related to the map in a manner as described herein facilitates efficient loading of the map during a service request. For instance, when a request for a route is received, detailed information related to specific portions of the route is shared. For the remaining portion of the route, information from the higher levels is provided. Thus, the data required for loading the route is reduced.

In an example, each of the extended area quads may correspond to a maximum of four quads on the level underneath the level of the extended area quad. For instance, the quad 103-1 of level 103 corresponds to quads 102-1 to 102-4 of level 102. Similarly, the quad 102-1 of level 2, corresponds to quads 101-1 to 101-4 of level 1. In such a case, the quad on the lower level is also referred to as a child quad. Thus, in the above example, the quads 102-1 to 102-4 are child quads to quad 103-1. Further, the area of the extended area quad is four times the area of a corresponding child quad. For instance, the area of the quad 103-1 is equal to four times the area of the 102-1.

In an example, the quads may be identified based on a corresponding level number and a number inside the level. For instance, the quad 102-1 represents a first quad of the level 102. In another example, the quads may be identified based on the corresponding level number and coordinates of the bottom-left corner of the quad.

Thus, as described above, the data structure 100 may comprise two or more levels (n=2 or more, where n is the level number). In an example, each level in the data structure 100 covers same area. Further, as described above, every extended area quad is called a quad of a certain level, and can have maximum four quads on the level below. The four quads on the level below are also referred to as child quads. Further, the size of the extended area quad is four times the size of the child quad. Further, the lowest level of the data structure is called a base level and comprises detailed road network in base level quads. In an example, every level in the data structure contains less information than the level underneath.

Any features of embodiment 10 may be readily combined or permuted with any of the other embodiments 15, 20, 25, 30, 40, 50, 60, 63, 66, 70, 80, 90, 91, 92, 93, 94, 95, 96, and/or 97 in accordance with the invention.

Figure 1B:
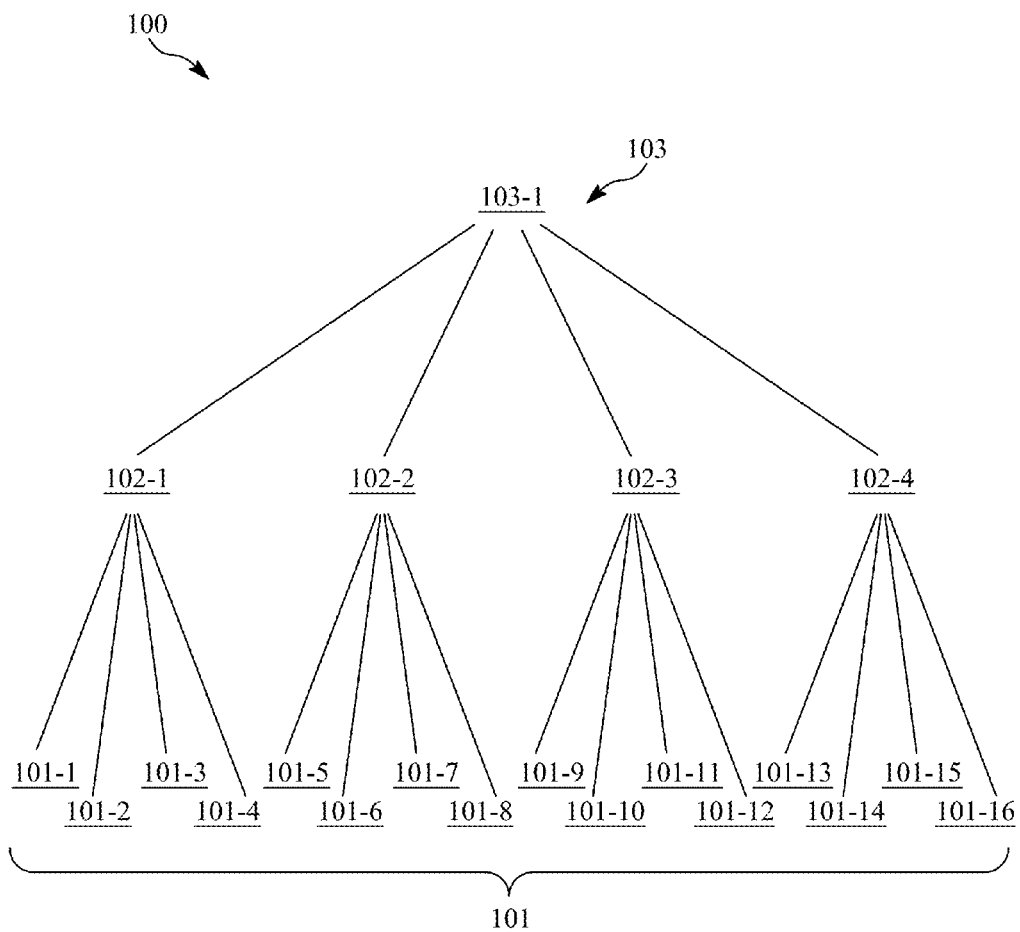
FIG. 1B demonstrates an embodiment 15 of a data structure for storing maps used for navigation of autonomous vehicles, in accordance with the invention as a diagram.

FIG. 1B demonstrates an embodiment 15 of the data structure 100. In said embodiment 15, a tree structure representation of the data structure 100 is illustrated. As shown in the FIG. 1B, the level 103 is the topmost level and the level 101 is the base level. The quad 103-1 has four child quads, i.e., the quads 102-1 to 102-4, associated to the quad 103-1 as branches. Similarly, each of the quads 102-1 to 102-4 has a corresponding set of child quads. For instance, the quad 102-1 has four branches connecting the quad 102-1 to the child quads 101-1 to 101-4.

Any features of embodiment 15 may be readily combined or permuted with any of the other embodiments 10, 20, 25, 30, 40, 50, 60, 63, 66, 70, 80, 90, 91, 92, 93, 94, 95, 96, and/or 97 in accordance with the invention.

Figure 2A:
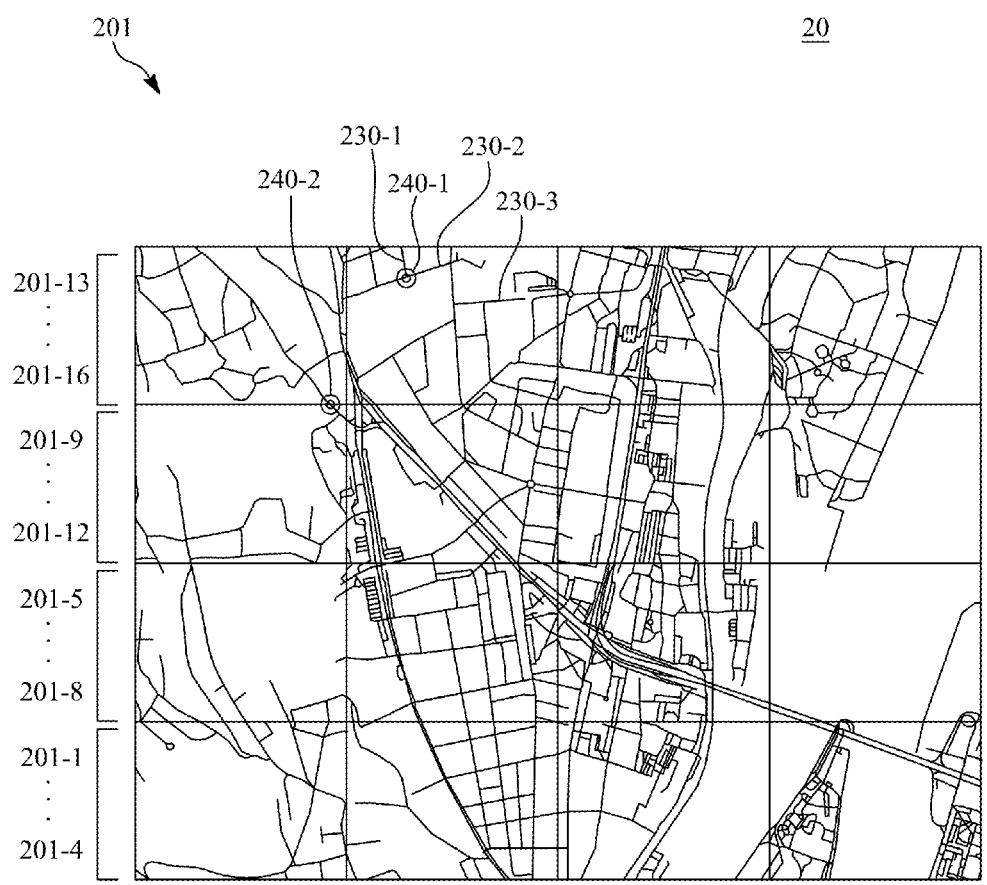
FIG. 2A demonstrates an embodiment 20 of a level of a data structure, in accordance with the invention as a diagram.

FIG. 2A demonstrates an embodiment 20 of a level 201 of a data structure. The data structure here may be similar to the data structure 100, used for storing maps. In said embodiment 20, the level 201 is a base level similar to the base level 101 in the hierarchy of the data structure 100. The level 201 comprises quads 201-1 to 201-16, as shown in the FIG. 2A. For the sake of brevity, row-wise numbering of quads has been done. For instance, the bottom most row comprises, from left to right, the quads 201-1 to quads 201-4. Other rows in the level 201 are numbered similar to the bottom row.

The level 201 further comprises a plurality of road segments. For the sake of brevity, only road segments 230-1, 230-2, and 230-3 have been shown in the FIG. 2A. The level 201 further comprises a plurality of junctions. For the sake of brevity, only junctions 240-1 and 240-2 have been shown in the FIG. 2A. In an example, a junction may be understood as a point of intersection of two or more road segments. For instance, as shown in the FIG. 2A, the junction 240-1 is the point of intersection of the road segment 230-1 and the road segment 230-2.

Any features of embodiment 20 may be readily combined or permuted with any of the other embodiments 10, 15, 25, 30, 40, 50, 60, 63, 66, 70, 80, 90, 91, 92, 93, 94, 95, 96, and/or 97 in accordance with the invention.

Figure 2B:
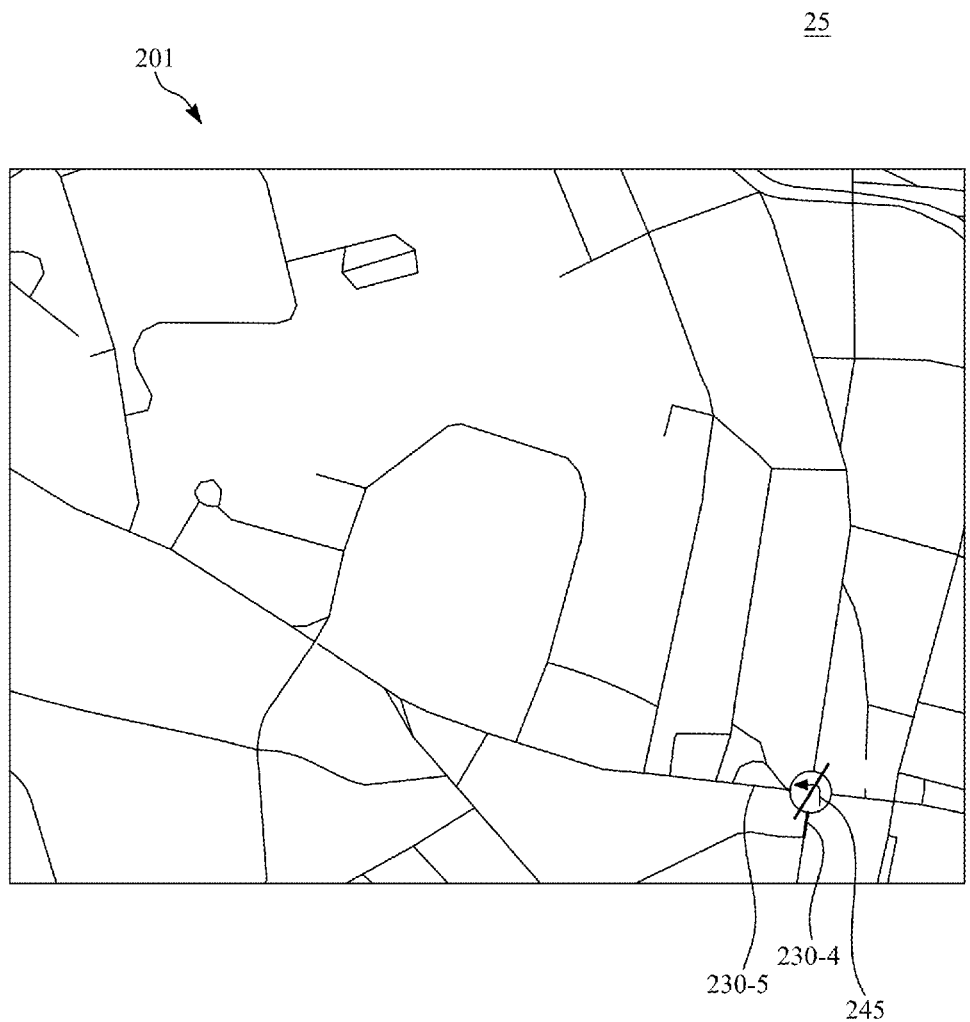
FIG. 2B demonstrates an embodiment 25 of a level of a data structure, in accordance with the invention as a diagram.

FIG. 2B demonstrates an embodiment 25 of the level 201 of a data structure. The data structure here is similar to the data structure 100 in FIG. 1A, used for storing maps. The level 201 comprises a road segment 230-4, a road segment 230-5, and a turn restriction 245. In an example, when a turn from the road segment 230-4 to the road segment 230-5 is prohibited, the turn restriction 245 is displayed. The turn restriction 245, in an example, is stored as a sequence of road segments which must not be traversed in a given order. In an example, the turn restriction 245 may be a local restriction, i.e., the turn restriction 245 may be present in a single quad.

As may be gathered, data associated with a region which the level 201 represents is stored on a per quad basis. Quad based storage of the data facilitates efficient loading of the data as a quad is stored and loaded as one chunk of spatially related data. For instance, when a road segment of a quad is required for path finding, it is highly probable that other road segments in vicinity to the road segment may also be required. In such a case, the road segments in vicinity would be loaded.

Any features of embodiment 25 may be readily combined or permuted with any of the other embodiments 10, 15, 20, 30, 40, 50, 60, 63, 66, 70, 80, 90, 91, 92, 93, 94, 95, 96, and/or 97 in accordance with the invention.

Figure 3:
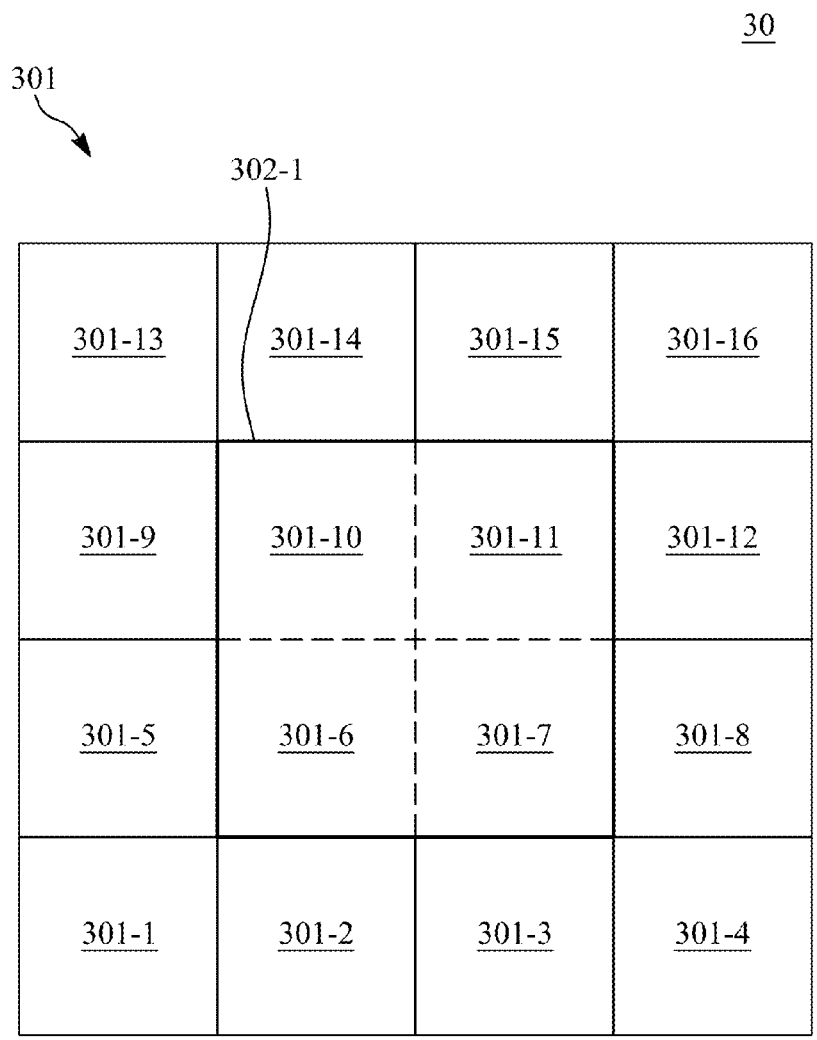
FIG. 3 demonstrates an embodiment 30 of a level of a data structure, in accordance with the invention as a diagram.

FIG. 3 demonstrates an embodiment 30 of a level 301 of a data structure. The data structure is similar to the data structure 100 in the FIG. 1A, used for storing maps. In an example, the level 301 may be a base level similar to the base level 101. In an implementation, the level 301 may comprise a plurality of base level quads 301-1 to 301-16. As mentioned earlier, the base level comprises detailed information pertaining to a region. Thus the base level quads 301-1 to 301-16 may comprise detailed information, such as road segments of a region.

In an implementation, one or more base level quads may be combined for generating an extended area quad. For instance, as shown in the FIG. 3, the quads 301-6, 301-7, 301-10, and 301-11 may be combined to form a quad 302-1 of a level 302 (not shown in the FIG. 3) immediately above the level 301. In an example, an extended area may be defined around the extended area quad. For instance, for the extended area quad 302-1, the extended area may comprise quads, 301-1, 301-2, 301-3, 301-4, 301-5, 301-8, 301-9, 301-12, 301-13, 301-14, 301-15, and 301-16.

Any features of embodiment 30 may be readily combined or permuted with any of the other embodiments 10, 15, 20, 25, 40, 50, 60, 63, 66, 70, 80, 90, 91, 92, 93, 94, 95, 96, and/or 97 in accordance with the invention.

Figure 4:
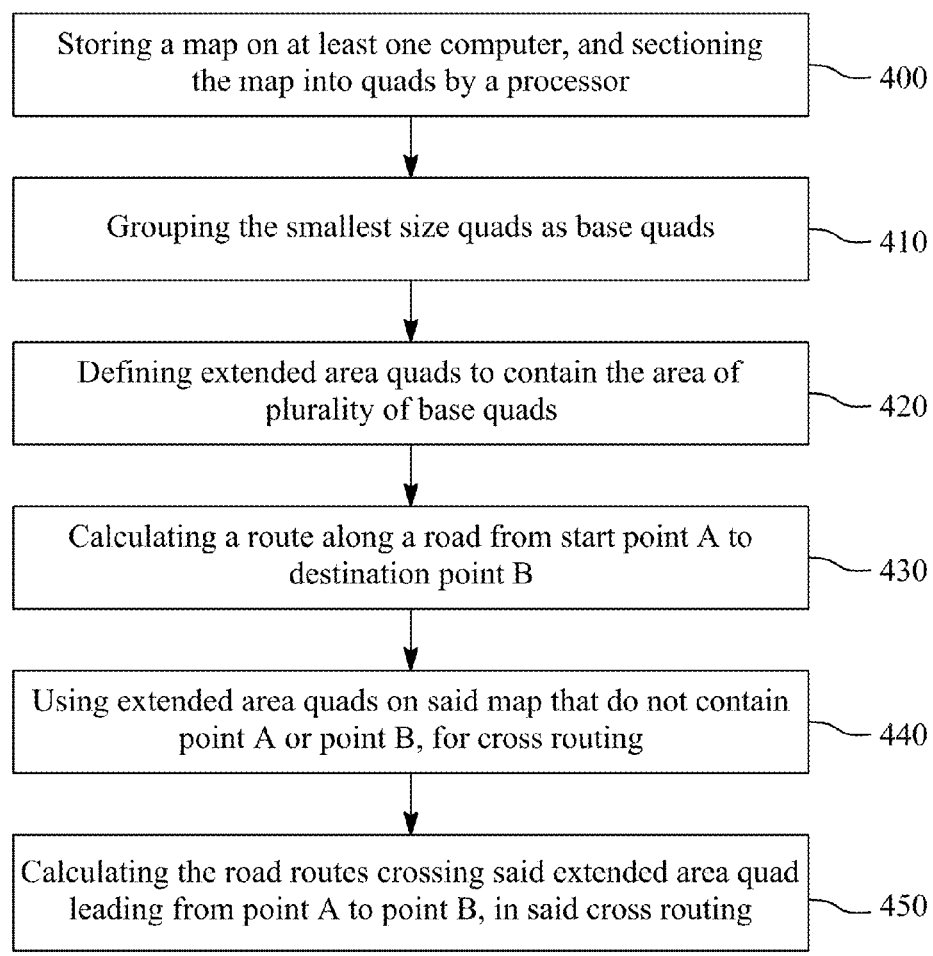
FIG. 4 demonstrates an embodiment 40 of an electronic route navigation method used in navigating an autonomous vehicle in a road network, in accordance with the invention as a flow diagram.

FIG. 4 demonstrates an embodiment 40 of an electronic route navigation method used in navigating an autonomous vehicle in a road network, in accordance with the invention as a flow diagram. The method could be implemented in a system identical or similar to embodiment 70 in FIG. 7 or, for example, as discussed in the other parts of the description. An end-user of the method could use a user interface identical or similar to that disclosed with embodiment 93 in FIG. 10.

In phase 400, a map is stored on at least one computer and is sectioned into quads by a processor. In an implementation, the map is stored in a plurality of levels arranged in a hierarchy similar to the hierarchy of the data structure 100 as described in the FIGS. 1A and 1B. While storing the map, at each of the levels, the region of the map stored in the level is sectioned into at least one quad. In an example, the at least one computer may be a cloud server. In another example, the at least one computer may be a computing device communicatively coupled to an autonomous vehicle seeking to navigate using the map. Examples of computing device may include mobile devices like a laptop, smartphones, PDAs, and the like coupled with a navigation system of the autonomous vehicle. In another example, the computing device may be a navigation system of the autonomous vehicle.

In phase 410, smallest size quads are grouped as base level quads. The base level quads are present in a bottom most level of the hierarchy, also referred to as the base level. Further, the relation between the base level quads and an extended area quad level is similar to relation as defined in the Equation 1 above. The base level quads comprise detailed information such as details related to road segments, turn restrictions, road blocks, and the like, related to a corresponding region.

In phase 420, the extended area quads are defined to include the area of a plurality of base level quads. An extended area quad is a quad of a level other than the base level. In an example, an area of an extended area quad of a level is equal to four times the area of a quad of a level immediately underneath the extended area quad. In other terms, an area of a quad at a level A+1 is equivalent to an area of four quads of a level A.

In phase 430, a route along a road is calculated from a start point A to a destination point B. In an example, a passenger or an operator of the autonomous vehicle may provide a request for traversing from the start point A to the destination point B. On receiving the request, the route along the road is calculated from the start point A to the destination point B. For calculating the route, one or more quads related to the map may be used.

In phase 440, the extended area quads on the map that do not include the start point A or the destination point B are used for cross routing. In an implementation, the route is calculated in a manner such that, quads comprising the start point A and the destination point B are the base level quads. Further, quads other than the base level quads include remaining portion of the route and are the extended area quads. The extended area quads are used for cross routing. As mentioned above, data is pruned from level to level, and thus, the extended area quads comprise less information as compared to the base level quads. As a result, less data is required for loading the map, thereby providing efficient loading of data.

In phase 450, only road routes crossing the extended area quad leading from the start point A to the destination point B are calculated in the cross routing. Computation of only the road routes crossing the extended area quads reduces the computation overhead associated with the calculation of the route. As a result, computation time for computing the route is reduced. Further, the volume of the data used for calculation of the route is reduced, thereby increasing the efficiency of route calculation.

Any features of embodiment 40 may be readily combined or permuted with any of the other embodiments 10, 15, 20, 25, 30, 50, 60, 63, 66, 70, 80, 90, 91, 92, 93, 94, 95, 96, and/or 97 in accordance with the invention.

Figure 5:
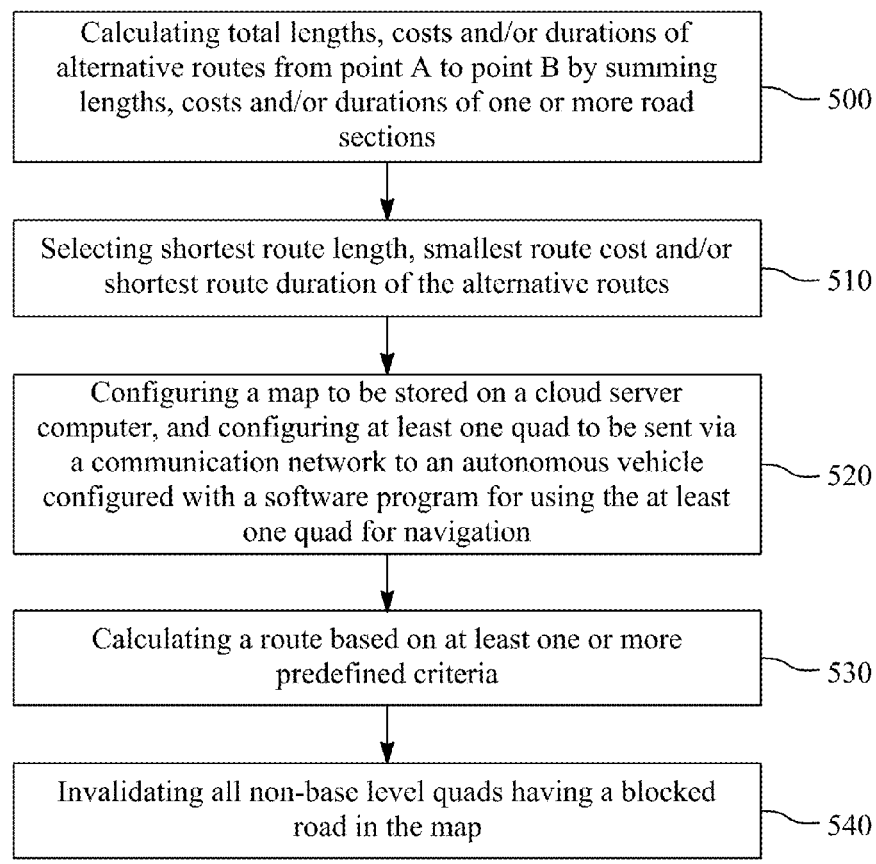
FIG. 5 demonstrates an embodiment 50 of an electronic route navigation method used in navigating an autonomous vehicle in a road network, in accordance with the invention as a flow diagram.

FIG. 5 demonstrates an embodiment 50 of an electronic route navigation method used in navigating an autonomous vehicle in a road network, in accordance with the invention as a flow diagram. The method could be implemented in a system identical or similar to embodiment 80 in FIG. 8 or, for example, as discussed in the other parts of the description. An end-user of the method could use a user interface identical or similar to that disclosed with embodiment 94 in FIG. 11.

In phase 500, total lengths, costs and/or durations of alternative routes from a start point A to a destination point B are calculated by summing lengths, costs and/or durations of one or more road sections. For example, the road sections of a base level quad including the start point A may be used. In another example, the road sections crossing at least one quad without the start point A or the destination point B and providing a section of a route from the start point A to the destination point B may be used. In yet another example, the road sections of a base level quad leading to the destination point B may be used. In yet another example, one or more of the aforementioned road segments example may be combined.

In phase 510, a shortest route length, a smallest route cost and/or a shortest route duration of the alternative routes is selected. Once the alternative routes from the start point A to the destination point B are computed, the alternative routes may be processed for identifying an alternative route from the start point A to the destination point B. The alternative routes are routes having the shortest route length, the smallest route cost and/or the shortest route duration.

In phase 520, a map is configured to be stored on a cloud server computer, and at least one quad is configured to be sent via a communication network to an autonomous vehicle. The autonomous vehicle is configured with a software program for using the at least one quad for navigation. In an implementation, the map is stored as per the data structure 100 described above in conjunction with the FIG. 1A and FIG. 1B. As per the data structure 100, the map is stored in a plurality of levels in the hierarchical arrangement. Further, each of the levels has at least one quad. In an example, when the autonomous vehicle is to traverse from the start point A to the destination point B, a route is calculated from the start point A to the destination point B. Once the route is calculated, the cloud server transmits the at least one quad related to the route to the autonomous vehicle. The software program of the autonomous vehicle uses the at least one quad for navigating the autonomous vehicle from the start point A to destination point B.

In phase 530, calculation of a route is done based on at least one or more predefined criteria. In an example, the criteria may include, but are not limited to, turn restrictions, closed road segments, toll roads enabled, unpaved roads enabled, ferries enabled and/or highways enabled.

In phase 540, all non-base level quads having a blocked road in the map are invalidated. Invalidation of such non-base level quads reduces the data which is to be processed for route computation, thereby reducing the time taken for computing the route. In another example, only the blocked roads are invalidated, i.e., not considered for computation of the route. Other roads, i.e., the non-blocked roads or the functional roads present in the non-base level may be considered for computation of the route.

Any features of embodiment 50 may be readily combined or permuted with any of the other embodiments 10, 15, 20, 25, 30, 40, 60, 63, 66, 70, 80, 90, 91, 92, 93, 94, 95, 96, and/or 97 in accordance with the invention.

Figure 6A:
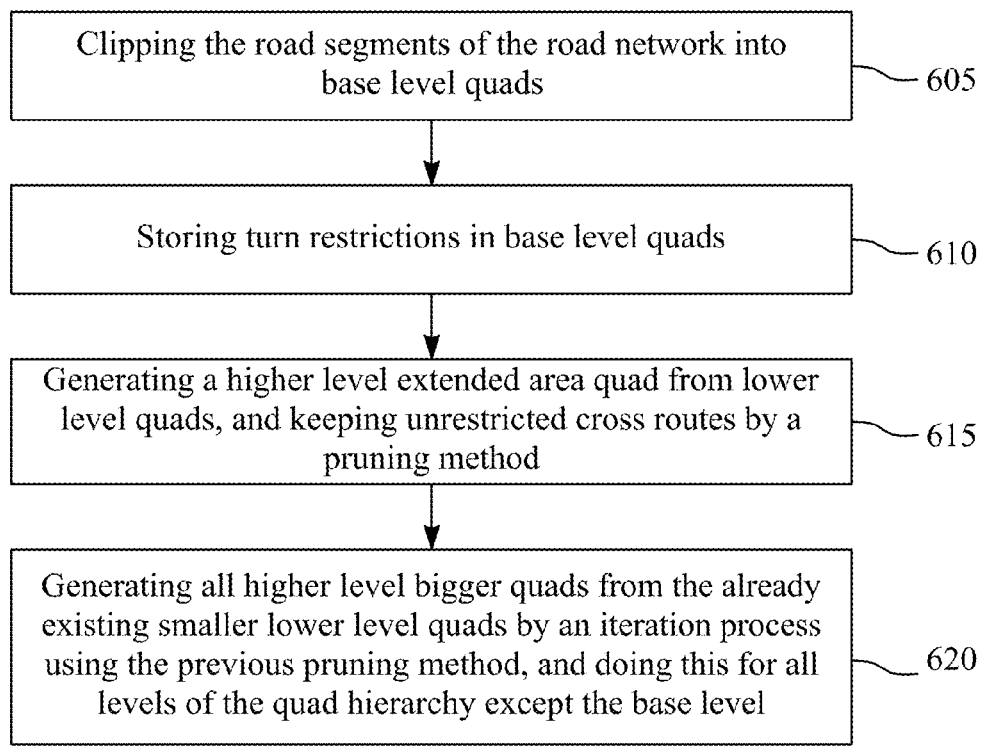
FIG. 6A demonstrates an embodiment 60 of an electronic route navigation method used in navigating an autonomous vehicle in a road network, in accordance with the invention as a flow diagram.

FIG. 6A demonstrates an embodiment 60 of an electronic route navigation method used in navigating an autonomous vehicle in a road network, in accordance with the invention as a flow diagram. The method could be implemented in a system identical or similar to embodiment 90 in FIG. 9A or, for example, as discussed in the other parts of the description. An end-user of the method could use a user interface identical or similar to that disclosed with embodiment 95 in FIG. 12A.

In phase 605, a plurality of road segments of a road network in a region are clipped into one or more base level quads. In an example, a map is stored according to a predefined data structure. The data structure may be similar to the data structure 100 as described in FIG. 1A and FIG. 1B. In said example, detailed information, such as information related to the plurality of segments is stored at the base level. In an example, the information in the base level is stored in the one or more base level quads, and thus the road segments are clipped such that the road segments are confined in the base level quads.

In phase 610, one or more turn restrictions are stored in the one or more base level quads. In addition to storing the road segments, the base level quads may also include information, such as the turn restrictions. In an example, a turn restriction may be stored as a sequence of road segments which may not be traversed in the sequence.

In phase 615, a pruning method is performed for generating an extended area quad at a higher level using one or more quads of an immediate lower level. In the pruning methods unrestricted cross routes in the extended area quad are retained. In an example, an area of the extended area quad is equal to an area comprising four quads of the immediate lower level. The pruning method reduces the amount of information to be stored in the extended area quad. As mentioned, unrestricted cross routes are stored in the extended area quads.

In phase 620, the pruning method is performed iteratively to generate one or more extended area quads at each level of the hierarchy except the base level. As mentioned above, the extended area quads for each of the levels are generated based on the level immediately underneath the level for which the extended area quads are being generated.

Thus, as described above, a preprocessing stage is performed for storing data related to a map. In the preprocessing stage, the road segments of the road network are clipped into base level quads. Further, turn restrictions are stored in base level quads. Further, a pruning method generates a higher level extended area quad from lower level quads and keeps unrestricted cross routes. Thereafter, an iteration process uses the previous pruning method to generate all higher level bigger quads from the already existing smaller lower level quads. This process is done for all levels of the data structure hierarchy except the base level.

Any features of embodiment 60 may be readily combined or permuted with any of the other embodiments 10, 15, 20, 25, 30, 40, 50, 63, 66, 70, 80, 90, 91, 92, 93, 94, 95, 96, and/or 97 in accordance with the invention.

Figure 6B:
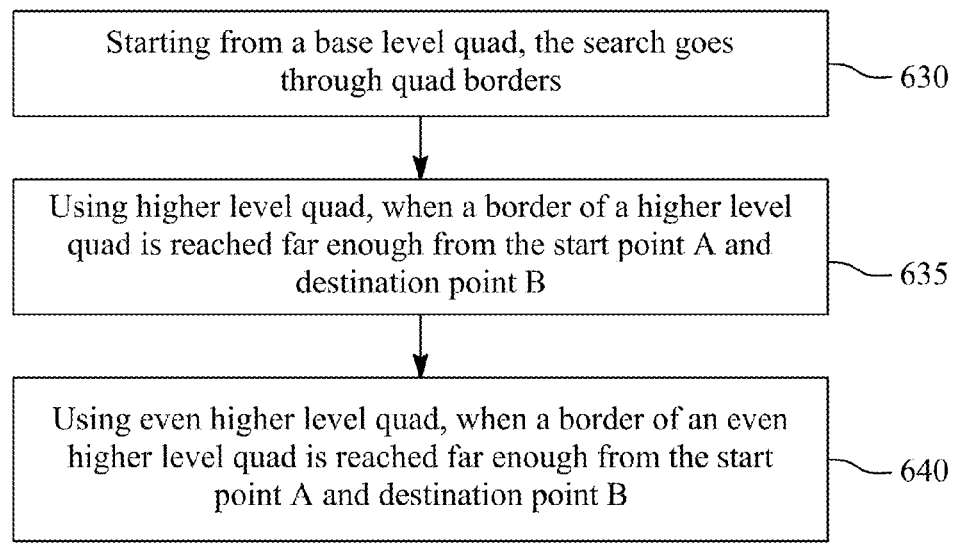
FIG. 6B demonstrates an embodiment 63 of an electronic route navigation method used in navigating an autonomous vehicle in a road network, in accordance with the invention as a flow diagram.

FIG. 6B demonstrates an embodiment 63 of an electronic route navigation method used in navigating an autonomous vehicle in a road network, in accordance with the invention as a flow diagram. The method could be implemented in a system identical or similar to embodiment 91 in FIG. 9B or, for example, as discussed in the other parts of the description. An end-user of the method could use a user interface identical or similar to that disclosed with embodiment 96 in FIG. 12B.

In phase 630, starting from a base level quad, a search is configured to go through quad borders. In an example, for searching a route from the start point A to the destination point B, the search may be performed across the quad borders. For instance, the search may start at a base level and may go through all the quads of the base level. Subsequently, the search may move to a level immediately above the base level and may go through all the quads of the level above the base level and so on. In an example, the search starts from the base level quad comprising the start point A.

In phase 635, when a border of a higher level quad is reached far enough from the start point A and the destination point B, the higher level quad is configured to be used. As mentioned above, the search is performed across the quad borders. In an example, when the search reaches a border of a higher level quad, a distance between the border and the start point A and a distance between the border and the destination point B is computed. In a case when the distance between the border and the start point A and the distance between the border and the destination point B is greater than a defined threshold, the higher level quad is used.

In phase 640, when a border of an even higher level quad is reached far enough from the start point A and the destination point B, the even higher level quad is used. As mentioned above, based on a distance between the search and the start point A and the distance between the search and the destination point B, the higher level quad is used. In an example, the process may continue until the distance is less than the defined threshold.

Thus, as described above, the search for road routes from A to B goes through quad borders starting from a base level quad. In an example, the higher level quad is used when a border of a higher level quad, for example, level 1, is reached far enough from the start point and the destination point. Further, the even higher level quad is used when a border of an even higher level quad is reached far enough from the start point and the destination point. For example, level 2, is used. In an example, the search may continue through the data hierarchy in a similar way.

Any features of embodiment 63 may be readily combined or permuted with any of the other embodiments 10, 15, 20, 25, 30, 40, 50, 60, 66, 70, 80, 90, 91, 92, 93, 94, 95, 96, and/or 97 in accordance with the invention.

Figure 6C:
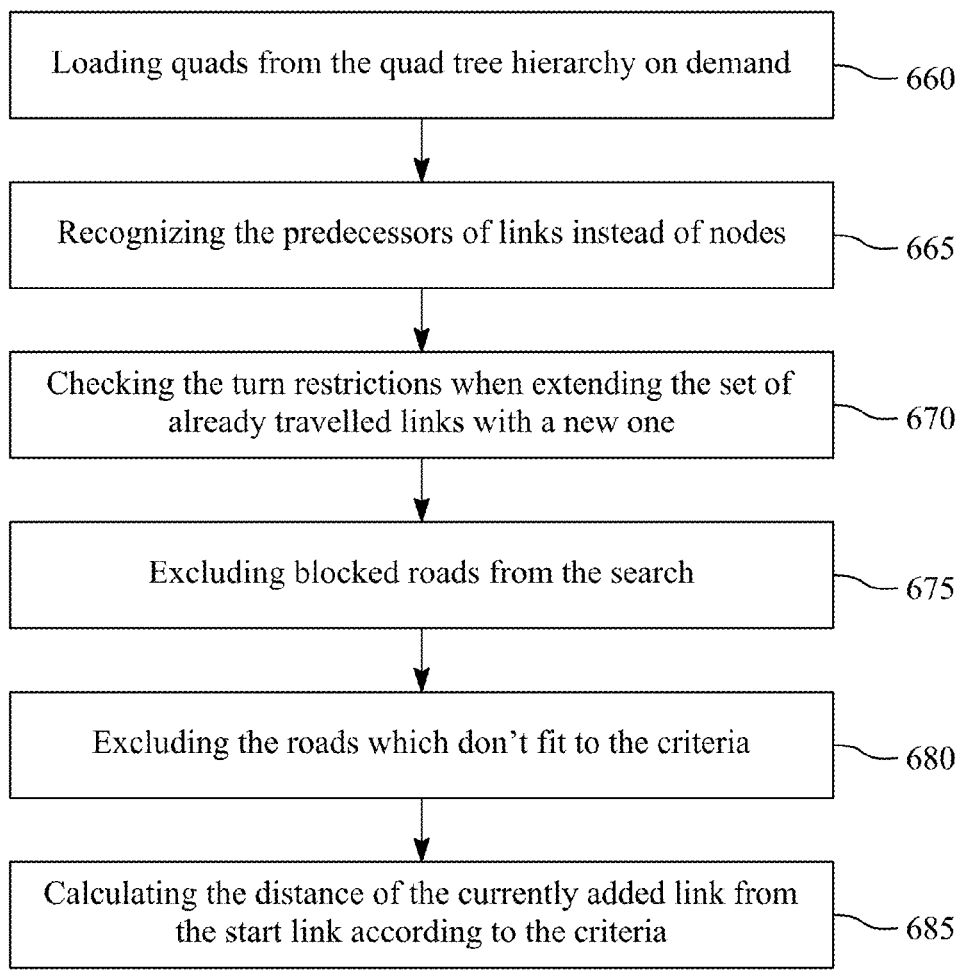
FIG. 6C demonstrates an embodiment 66 of an electronic route navigation method used in navigating an autonomous vehicle in a road network, in accordance with the invention as a flow diagram.

FIG. 6C demonstrates an embodiment 66 of an electronic route navigation method used in navigating an autonomous vehicle in a road network, in accordance with the invention as a flow diagram. The method could be implemented in a system identical or similar to embodiment 10 or 70 in FIG. 1 or 7 or, for example, as discussed in the other parts of the description. An end-user of the method could use a user interface identical or similar to that disclosed with embodiment 97 in FIG. 12C.

In phase 660, quads from the quad tree hierarchy are loaded on demand. In an implementation, an optimum route between the start point A and the destination point B is to be computed. The optimum route may be understood as a route having the shortest length, cost, and/or duration. For computing the optimum route, the quads from the quad tree hierarchy may be loaded.

In phase 665, the predecessors of links, instead of nodes, are recognized. In an example, once the quads from the quad tree hierarchy are loaded, the predecessors of one or more links present in the quad tree hierarchy are recognized.

In phase 670, the turn restrictions are checked when extending the set of already travelled links with a new link. In an example, for adding a new link one or more turn restrictions are taken into account. As mentioned previously, the turn restrictions are stored in the quads present at the base level.

In phase 675, blocked roads from the search are excluded. In an example, when the search for the optimum route is being performed, all the road segments which are blocked are excluded from the search. Further, in an example, all non-base level quads comprising such blocked roads may be invalidated.

In phase 680, the roads which don't fit to the criteria are excluded. Examples of criteria may include but are not limited to, turn restrictions, closed road segments, toll roads enabled, unpaved roads enabled, ferries enabled, and/or highways enabled. In an implementation, the road segments, i.e., the roads, which do no fit to the criteria, are excluded from the search.

In phase 685, a distance of the currently added link from the start link is calculated according to the criteria. In an example, the distance between the currently added link from the start link is calculated based on at least one of the aforementioned criteria.

Thus, as described above, an edge labelling Dijkstra's algorithm may be used for computing an optimum route in a memory medium of an autonomous vehicle and/or network server for controlling the navigation of the autonomous vehicle. The Dijkstra's algorithm may comprise one or more functions, for example, loading quads from the quad tree hierarchy on demand. Further, the predecessors of links instead of nodes may be recognized. Furthermore, the turn restrictions are checked when extending the set of already travelled links with a new link. Another example of a function may include excluding blocked roads from the search. In another example of a function, the roads which don't fit to the criteria described herein are excluded. Further, another example of a function may include calculating the distance of the currently added link from the start link according to the criteria described herein.

Any features of embodiment 66 may be readily combined or permuted with any of the other embodiments 10, 15, 20, 25, 30, 40, 50, 60, 63, 70, 80, 90, 91, 92, 93, 94, 95, 96, and/or 97 in accordance with the invention.

Figure 7:
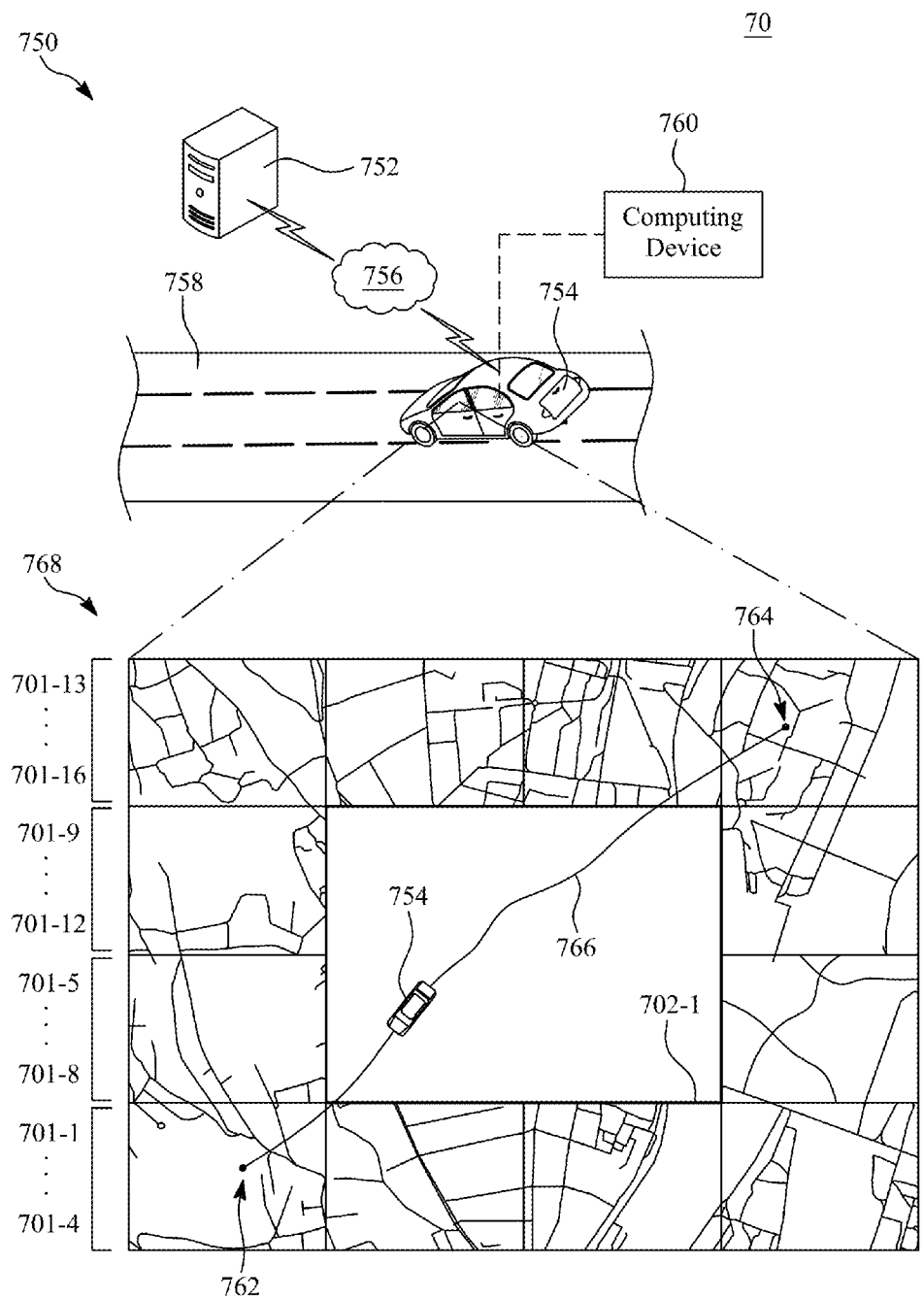
FIG. 7 demonstrates an embodiment 70 of an electronic route navigation system, in accordance with the invention as a block diagram.

FIG. 7 demonstrates an embodiment 70 of an electronic route navigation system 750, hereinafter referred to as system 750, for navigating an autonomous vehicle in a road network. In an implementation, the system 750 comprises a cloud server network 752 and an autonomous vehicle 754 communicatively coupled to the cloud server network 752 through a communication network 756.

The cloud server network 752, which may include an input-output device, usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realise the cloud network used by the system 750 of the invention. The cloud server network 752 can be purchased as a separate solution from known vendors such as Microsoft and Amazon and HP (Hewlett-Packard). The cloud server network 752 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud server network 752 is preferred despite its high cost due to the reduced latency that is required and/or preferred for operating the system 750 for facilitating navigation of autonomous vehicles, such as the autonomous vehicle 754.

The autonomous vehicle 754 is essentially a driverless car, or a car that can operate automatically some driving tasks with the driver onboard, but without him driving. The autonomous vehicle 754 may be a truck, any two-wheeled or four-wheeled vehicle, etc. The autonomous vehicle 754 may be used for transporting people and objects along predefined routes.

The communication network 756 is the wireless Internet or the telephony network, which is typically a cellular network such as UMTS—(Universal Mobile Telecommunication System), GSM—(Global System for Mobile Telecommunications), GPRS—(General Packet Radio Service), CDMA—(Code Division Multiple Access), 3G-, 4G-, Wi-Fi and/or WCDMA (Wideband Code Division Multiple Access)-network.

The system 750 further comprises a plurality of road routes comprising a road network (not shown in the FIG. 7). For the sake of brevity, only a segment 758 of a road route is shown in the FIG. 7.

The cloud server network 752, in an implementation, comprises a map on at least one computer. In an example, the map is stored on the computer as per a defined data structure, such as the data structure 100 described in the FIGS. 1A and 1B. Thus, the map is sectioned into a plurality of levels and corresponding quads, for instance, by a processor of the computer for storing the map. In an example, the processor is configured to group the smallest sized quads as base level quads. The base level quads are present in a bottom most level of the plurality of levels. Subsequently, based on the base level quads, the processor is configured to generate extended area quads for a level immediately above the base level.

In an implementation, the autonomous vehicle 754 comprises a computing device 760. The computing device 760 may be a smartphone and/or a tablet used to select a predefined routemap operation from the map operations offered by the cloud based map services. The computing device 760 is typically a mobile smartphone, such as iOS, Android or a Windows Phone smartphone.

However, it is also possible that the computing device 760 is a mobile station, mobile phone or a computer, such as a PC-computer, Apple Macintosh-computer, PDA-device (Personal Digital Assistant), or UMTS—(Universal Mobile Telecommunication System), GSM—(Global System for Mobile Telecommunications), WAP—(Wireless Application Protocol), Teldesic-, Inmarsat-, Iridium-, GPRS—(General Packet Radio Service), CDMA—(Code Division Multiple Access), GPS—(Global Positioning System), 3G-, 4G-, Bluetooth-, WLAN—(Wireless Local Area Network), Wi-Fi and/or WCDMA (Wideband Code Division Multiple Access)-mobile station. Sometimes in some embodiments, the computing device 760 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system. In an example the computing device 760 may be a device, for instance a navigation system, embedded into the autonomous vehicle 754.

In an embodiment, a passenger or an operator of the autonomous vehicle 754 may provide a request to the cloud server network 752 for navigating and/or transporting goods from a start point 762 to a destination point 764. In an example, the request may be provided through the computing device 760.

In an implementation, on receiving the request, the cloud server network 752 is configured to calculate a route 766 from the start point 762 to the destination point 764. In an example, the cloud server network 752 may use the extended area quads which do not comprise the start point 762 and/or the destination point 764 for cross routing. In the cross routing, the cloud server network 752 is configured to calculate only the road routes of the extended area quads leading from the start point 762 to the destination point 764. Once the route 766 is calculated, the cloud server network 752 transmits a message comprising information pertaining to the route 766 to the computing device 760 of the autonomous vehicle 754.

A screenshot 768 of the map depicting the route 766 is illustrated in the FIG. 7. As shown in the FIG. 7, the map comprises a plurality of base level quads 701-1 to 701-16, and an extended area quad 702-1. Further, the screenshot 768 of the map includes the start point 762 and the destination point 764 and a route 766 between the start point 762 and the destination point 764. Further, a position of the autonomous vehicle 754 is displayed in the screenshot 768 of the map, as shown in the FIG. 7.

On receiving the route 766, the computing device 760 may instruct the autonomous vehicle 754 for navigating along the route 766 for traversing from the start point 762 to the destination point 764.

Any features of embodiment 70 may be readily combined or permuted with any of the other embodiments 10, 15, 20, 25, 30, 40, 50, 60, 63, 66, 80, 90, 91, 92, 93, 94, 95, 96, and/or 97 in accordance with the invention.

Figure 8:
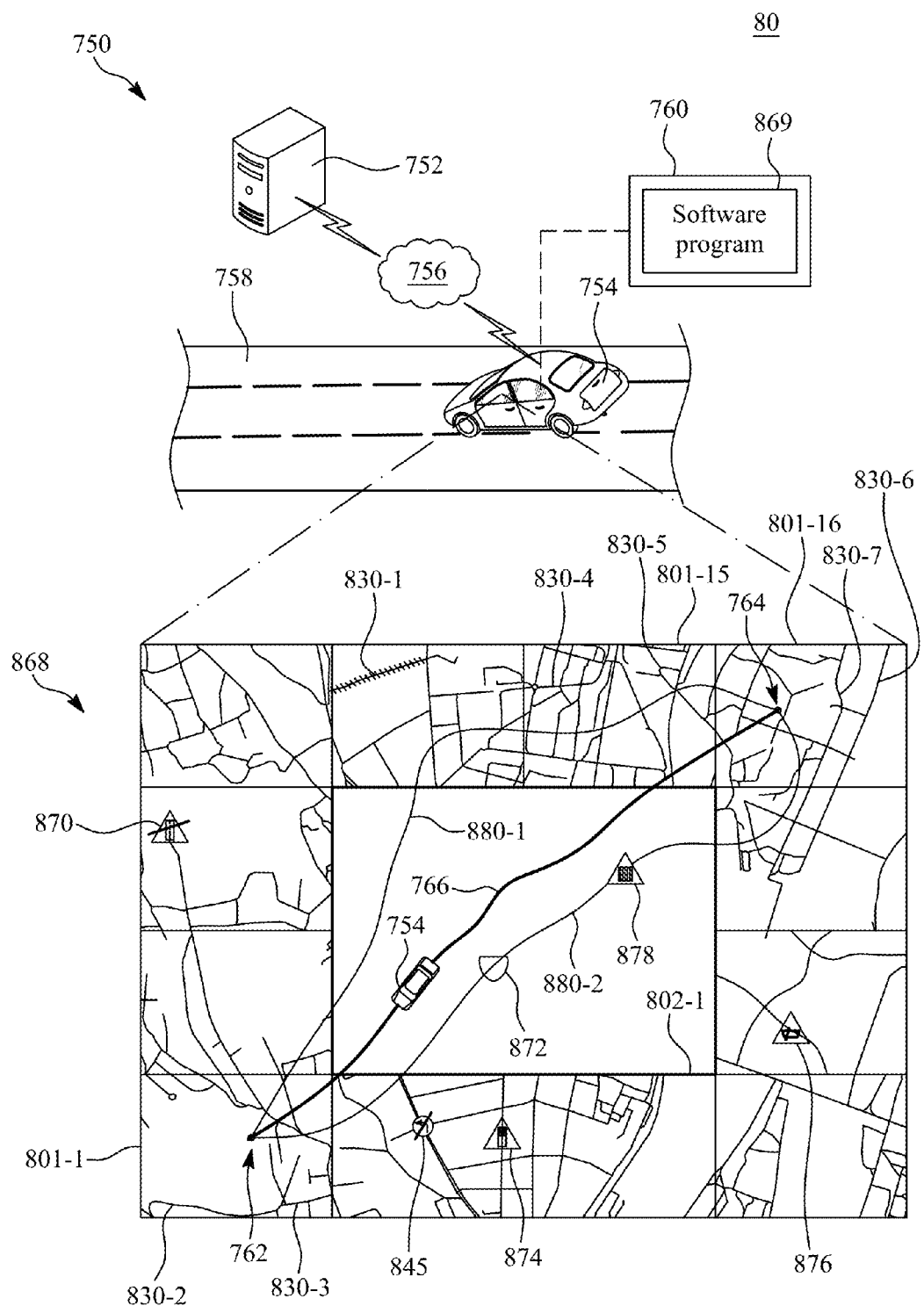
FIG. 8 demonstrates an embodiment 80 of an electronic route navigation system, in accordance with the invention as a block diagram.

FIG. 8 demonstrates an embodiment 80 of the system 750, according to an embodiment of the present subject matter. In said embodiment 80, the cloud server network 752 is configured to store a map in a manner as described above in the description of FIG. 7. In an implementation, the cloud server network 752 is configured to transmit at least one quad through the communication network 756 to the autonomous vehicle 754. The autonomous vehicle 754 is configured with a software program 869. The software program 869 uses the at least one quad for navigating the autonomous vehicle 754 from the start point 762 to the destination point 764. An example screenshot 868 of a base level of the map is illustrated in the FIG. 8. As shown in the FIG. 8, the map in the screenshot 868 includes a plurality of quads 801-1 to 801-16, which are the base level quads. The map further comprises an extended area quad 802-1 defined using one or more base level quads from the plurality of base level quads 801-10 to 801-16. As mentioned above, the cloud server network 752 transmits at least one quad from the quads 801-10 to 801-16, and the extended area quad 802-1 to the autonomous vehicle 754.

In an implementation, the cloud server network 752 is configured to compute the route 766 based on one or more criteria. Examples of criteria may include, but are not limited to, a turn restriction 845, a closed road segment 870, an enabled toll road 872, an enabled unpaved road 874, an enabled ferry notice 876, and/or a highway enabled notice 878.

In an example, when a road 830-1 of the map is blocked, the cloud server network 752 is configured to not use it or invalidate all non-base level quads comprising the blocked road. In said example, the road 830-1 is not used for computing the route 766.

In an implementation, the cloud server network 752 is configured to compute alternative routes 880-1 and 880-2 between the start point 762 and the destination point 764. In an example, the cloud server network 752 may compute the total length, costs and/or duration of the alternative routes 880-1 and 880-2 based on different types of road segments. For example, road sections 830-2 and 830-3 of the base level quad 801-1 including the point 762 may be used. Similarly, road sections 830-4 and 830-5 crossing at least one quad which does not include start point 762 or destination point 764 and which does not provide a section of the route 766 from the start point 762 to the destination point 764 may be used. For example, the base level quad 801-15 may be used. Further, road sections 830-6 and 830-7 of the base level quad 801-16 having the destination point 764 and leading to the destination point 764 may be used. Based on the aforementioned road section types, the cloud server network 752 may select the alternative route having the shortest route length, smallest route cost and/or shortest route duration. As an example, the alternative route 880-2 may be selected as the alternative route having the shortest route length, smallest route cost and/or shortest route duration.

Any features of embodiment 80 may be readily combined or permuted with any of the other embodiments 10, 15, 20, 25, 30, 40, 50, 60, 63, 66, 70, 90, 91, 92, 93, 94, 95, 96, and/or 97 in accordance with the invention.

Figure 9A:
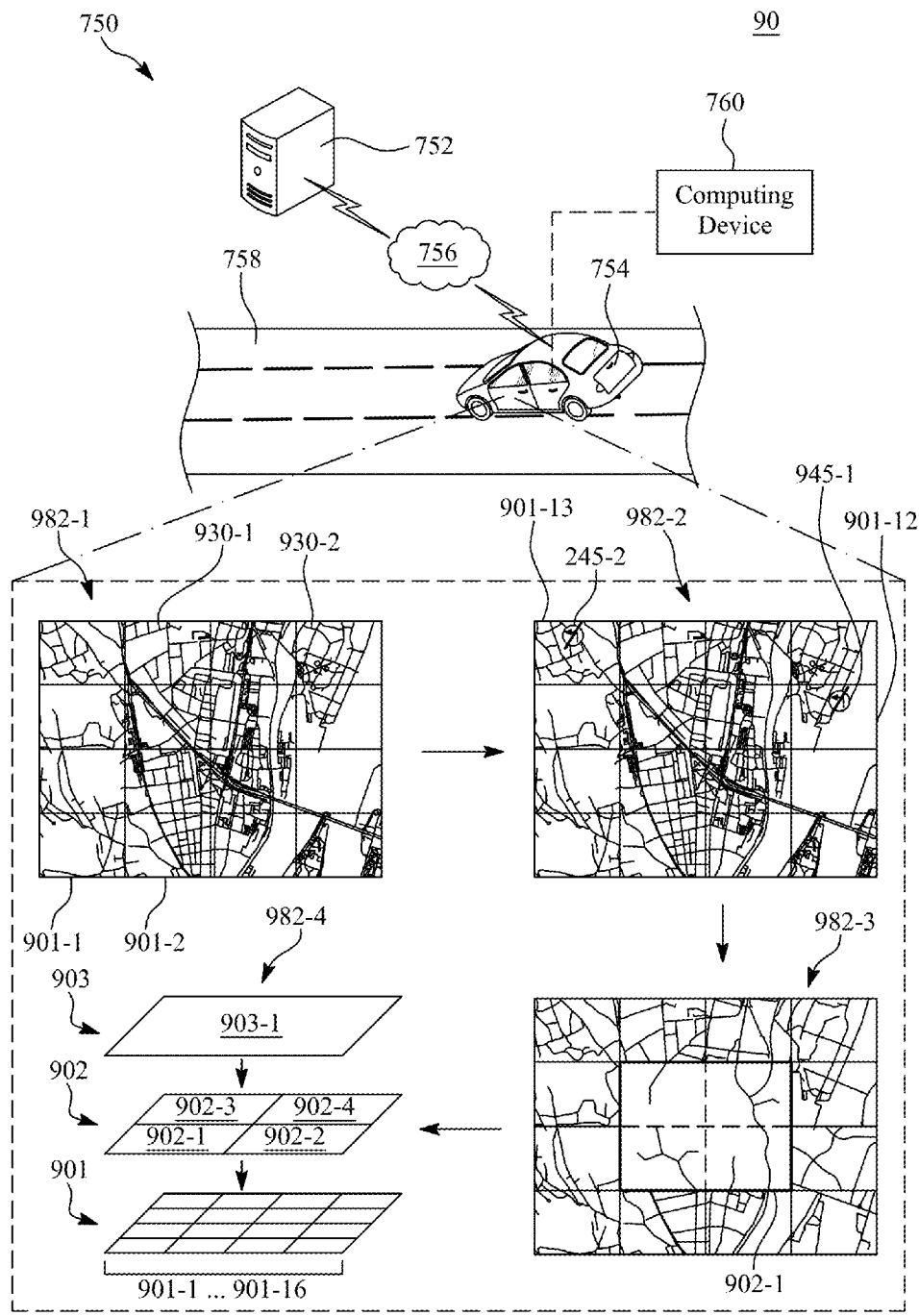
FIG. 9A demonstrates an embodiment 90 of an electronic route navigation system, in accordance with the invention as a block diagram.

FIG. 9A demonstrates an embodiment 90 of the system 750, in accordance with the present subject matter. In said embodiment 90, the cloud server network 752 is configured to perform pre-processing on data related to a map for facilitating efficient loading of the map for a future time. As shown in the FIG. 9A, in an example, the pre-processing may be performed in a plurality of stages 982. As an example, four stages, i.e., stage 982-1, stage 982-2, stage 982-3, and stage 982-4 are shown in the FIG. 9A. In the stage 982-1, the cloud server network 752 clips a plurality of road segments into a plurality of base level quads. For the sake of brevity, only road segments 930-1 and 930-2, and base level quads 901-1 and 902-2 have been shown in the FIG. 9A. In the stage 982-2, after clipping the road segments into the base level quads, the cloud server network 702 is configured to store one or more turn restrictions in a base level quad. The one or more turn restrictions are similar to the turn restrictions 245 as shown in the FIG. 2. As shown in the FIG. 9A, a turn restriction 945-1 may be stored in the base level quad 901-12 and a turn restriction 945-2 may be stored in the base level quad 901-13.

Subsequently, in the stage 982-3, the cloud server network 752 is configured to perform a pruning method for generating a higher level extended area quad 902-1 based on a plurality of lower level quads. In an example, the cloud server network 752 is configured to retain the unrestricted routes in the extended area quad 902-1. Further, in the stage 982-4, the cloud server network 752 is configured to perform the pruning method iteratively for all the levels. As a result, extended area quads for all levels are generated. For instance, as shown in the FIG. 9A, extended area quads 902-1 to 902-4 for a level 902 and extended area quad 903-1 for a level 903 are generated. The extended area quads 902-1 to 902-4 are generated based on the base level quads 901-1 to 901-16 of the level 901. The extended area quad 903-1 is generated based on the extended area quads 902-1 to 902-4.

Any features of embodiment 90 may be readily combined or permuted with any of the other embodiments 10, 15, 20, 25, 30, 40, 50, 60, 63, 66, 70, 80, 91, 92, 93, 94, 95, 96, and/or 97 in accordance with the invention.

Figure 9B:
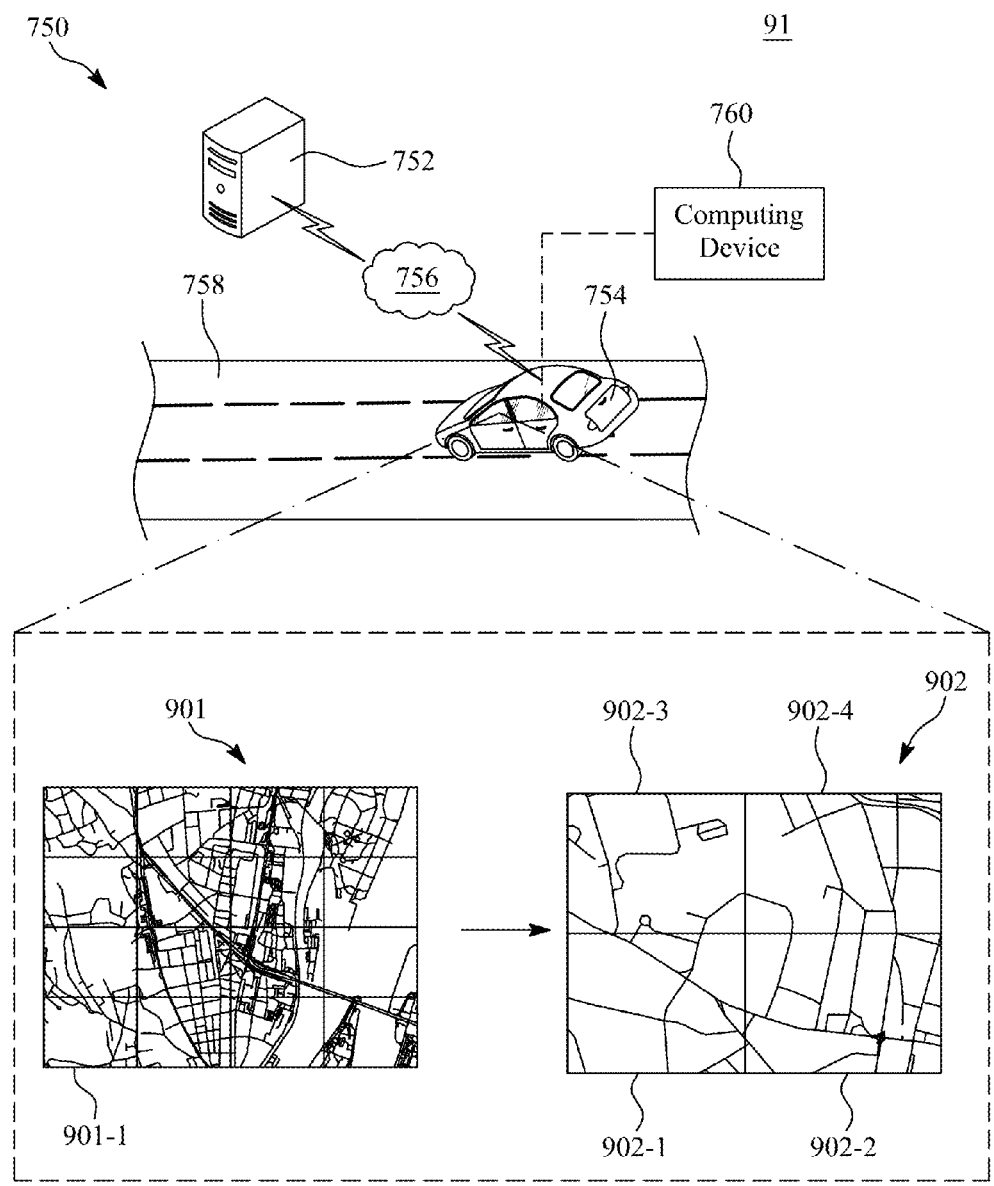
FIG. 9B demonstrates an embodiment 91 of an electronic route navigation system, in accordance with the invention as a block diagram.

FIG. 9B demonstrates an embodiment 91 of the system 750, according to an embodiment of the present subject matter. In an implementation, for searching a route (not shown in the FIG. 9B) from a start point to a destination point (not shown in the FIG. 9B), the cloud server network 752 is configured to search through borders of all the quads. The cloud server network 752 may start from a base level quad of a base level of a data structure, similar to the data structure 100 described in FIG. 1A. For instance, as shown in the FIG. 9B, the cloud server network 752 may start searching through a base level quad 902-1 (for the sake of brevity, only the base level quad 901-1 has been shown in the FIG. 9B) of a base level 901.

Once the cloud server network 752 searches through all the base level quads of the base level 901, the cloud server network 752 may move to a level immediately above the base level 901. For example, the cloud server network 752 may move to a level 902. The level 902 includes a plurality of extended area quads 902-1 to 902-4. When the cloud server network 752 calculation reaches an extended area quad, such as the extended area quad 902-1 of the level 902, the cloud server network 752 computes a distance between a border of the extended area quad 902-1 and the start point. Also, the cloud server network 752 computes a distance between the border of the extended area quad 902-1 and the destination point. In an example, when the distances are greater than a threshold distance, the cloud server network 752 uses the quad 902-1. Similarly, when the cloud server network 752 reaches a level immediately above the level 902, the cloud server network 752 reaches an extended area quad even higher than the extended area quads 902-1 to 902-4. In such a case, the cloud server network 752 recomputes a distance between the start point and the extended area quad at the even higher level and a distance between the destination point and the extended area quad at the even higher level. In a case when the distance between the start point and the extended area quad at the even higher level and the distance between the destination point and the extended area quad at the even higher level are greater than the threshold distance, the extended area quad at the even higher level is used.

Any features of embodiment 91 may be readily combined or permuted with any of the other embodiments 10, 15, 20, 25, 30, 40, 50, 60, 63, 66, 70, 80, 90, 92, 93, 94, 95, 96, and/or 97 in accordance with the invention.

Figure 9C:
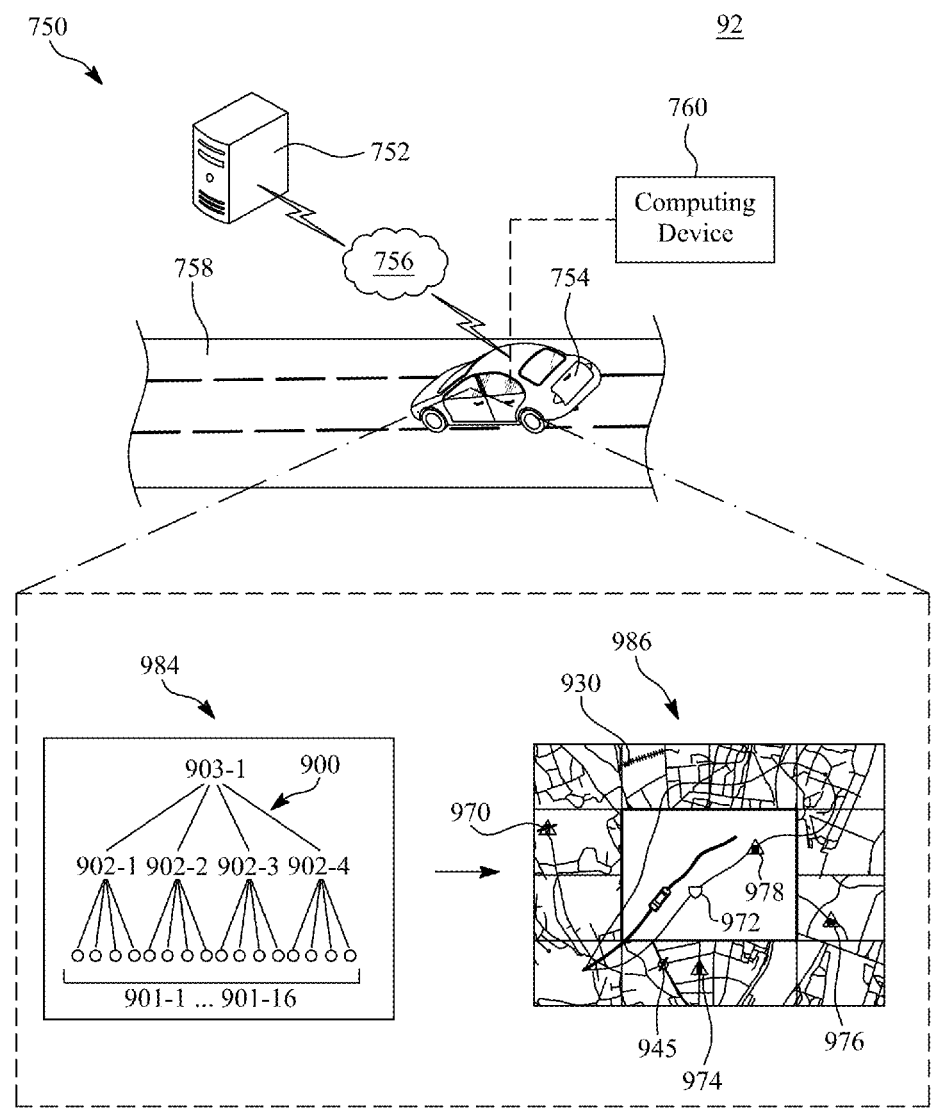
FIG. 9C demonstrates an embodiment 92 of an electronic route navigation system, in accordance with the invention as a block diagram.

FIG. 9C presents an embodiment 92 of the system 750. In an implementation, the cloud server network 752 performs one or more functions for calculating an optimum route between the start point and the destination point. Initially, in a stage 984, the cloud server network 752 loads quads from the quad tree hierarchy on demand. As shown in the FIG. 9C, a plurality of quads 901-1 to 901-16, 902-1 to 902-4, and 903-1 of a quad tree hierarchy of a data structure 900 are loaded on demand. Further, in the stage 984, the cloud server network 752 recognizes the predecessors of the links. In an example, the cloud server network 752 may not recognize the predecessors of the nodes.

In a stage 986, for extending a set of already travelled links with a new link, the cloud server network 752 checks one or more turn restrictions. For example, the cloud server network 752 may check a turn restriction 945, if applicable. Further, the cloud server network 752 excludes blocked roads, such as a blocked road 930 from the search. Also, in an example, the cloud server network 752 excludes one or more roads that do not fit criteria. Examples of the criteria may include, but are not limited to, a closed road segment 970, toll road enabled 972, unpaved roads enabled 974, ferries enabled 976, and/or highways enabled 978. In an example, the cloud server network 752 is configured to calculate the distance of the currently added link, i.e, the new link mentioned above from a start link according to the aforementioned criteria. For instance, while computing the distance, the cloud server network 752 may not include road segments which do not fit the aforementioned criteria.

Any features of embodiment 92 may be readily combined or permuted with any of the other embodiments 10, 15, 20, 25, 30, 40, 50, 60, 63, 66, 70, 80, 90, 91, 93, 94, 95, 96, and/or 97 in accordance with the invention.

Figure 10:
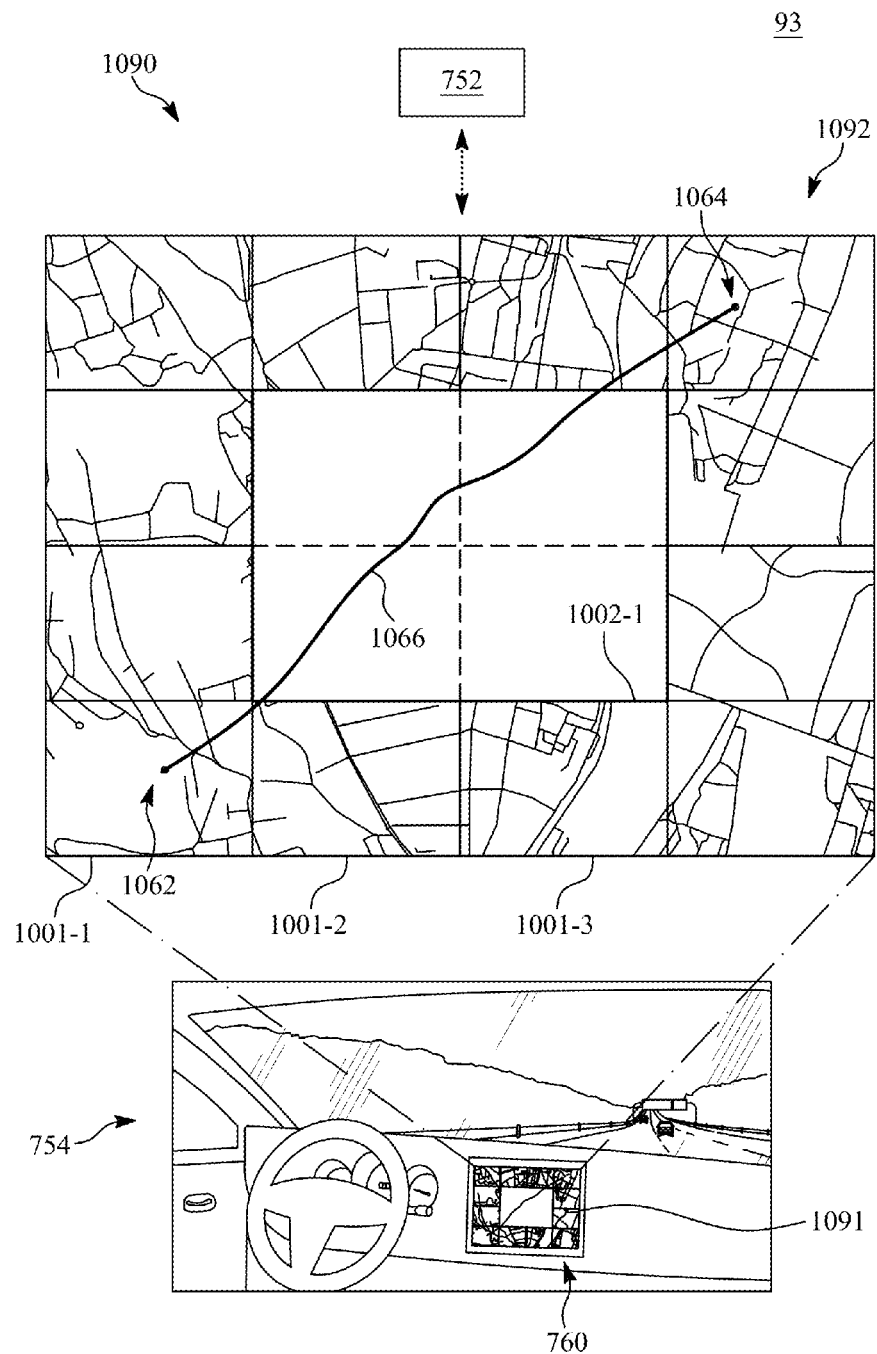
FIG. 10 demonstrates an embodiment 93 of a user interface of a software program product, in accordance with the invention as a screen shot diagram.

FIG. 10 demonstrates an embodiment 93 of a user interface 1090 of a software program product, in accordance with the invention as a screen shot diagram. In an example, the user interface 1090 is displayed on a display screen 1091 of the computing device 760 configured in the autonomous vehicle 754. The user interface 1090 of the embodiment 93 relates to an identical or similar system as described in FIGS. 4 and 7 of the embodiments 40 and 70, respectively. The cloud server network 752 behind the user interface 1090 could be e.g. embodiment 70 explained with respect to FIG. 7.

The software program product is stored on a non-transient memory medium on at least one of the cloud server network 752 or the computing device 760. The software program product may also be distributed between the cloud server network 752 and the computing device 760, so that some parts of the software program product reside on the cloud server network 752 and some parts of the software program product reside on the computing device 760. Further, the software program product is operable with at least one of the cloud server network 752 and the computing device 760, and also via the communication network 756 (not shown).

In an example, the computing device 760 is configured to have an application installed that allows the user to access the navigation services and access and/or download maps for navigation. The application user interface could be the aforementioned user interface 1090.

As shown in the FIG. 10, the user interface 1090 illustrates a map 1092 of a region. In an example, the map 1092 is stored on a computer, such as the cloud server network 752 or the computing device 760, in accordance with a data structure, such as the data structure 100. Thus, the map 1092 is stored in the form of a plurality of levels arranged in a hierarchical manner. As mentioned previously, each of the levels has at least one quad. In an example, for each of the plurality of levels, a processor of the computer is configured to section the map into corresponding at least one quad.

In an example, the smallest sized quads are grouped as base level quads. For instance, in the FIG. 10, quads 1001-1, 1001-2, and 1001-3 depict the base level quads. For the sake of brevity, only three base level quads have been shown in the FIG. 10. In an implementation, an extended area quad may be defined using one or more base level quads. In said implementation, the area of the extended area quad is equal to four base level quads. For instance, as shown in the map 1092, an extended area quad 1002-1 has an area equivalent to the area of four base level quads.

In an implementation, based on a user request, a route 1066 is calculated between a start point 1062 and a destination point 1064. For computation of the route 1066, one or more extended area quads of the map 1092 that do not include the start point 1062 and the destination point 1064 are used for cross routing. For instance, the extended area quad 1002-1 may be used for cross routing. In said example, only the road routes leading from the start point 1062 to the destination point 1064, crossing the extended area quad 1002-1 are used for cross routing.

Using the map 1092, a software program (not shown in the FIG. 10), such as the software program 800 may facilitate the navigation of the autonomous vehicle 754 from the start point 1062 to the destination point 1064.

Any features of embodiment 93 may be readily combined or permuted with any of the other embodiments 10, 15, 20, 25, 30, 40, 50, 60, 63, 66, 70, 80, 90, 91, 92, 94, 95, 96, and/or 97 in accordance with the invention.

Figure 11:
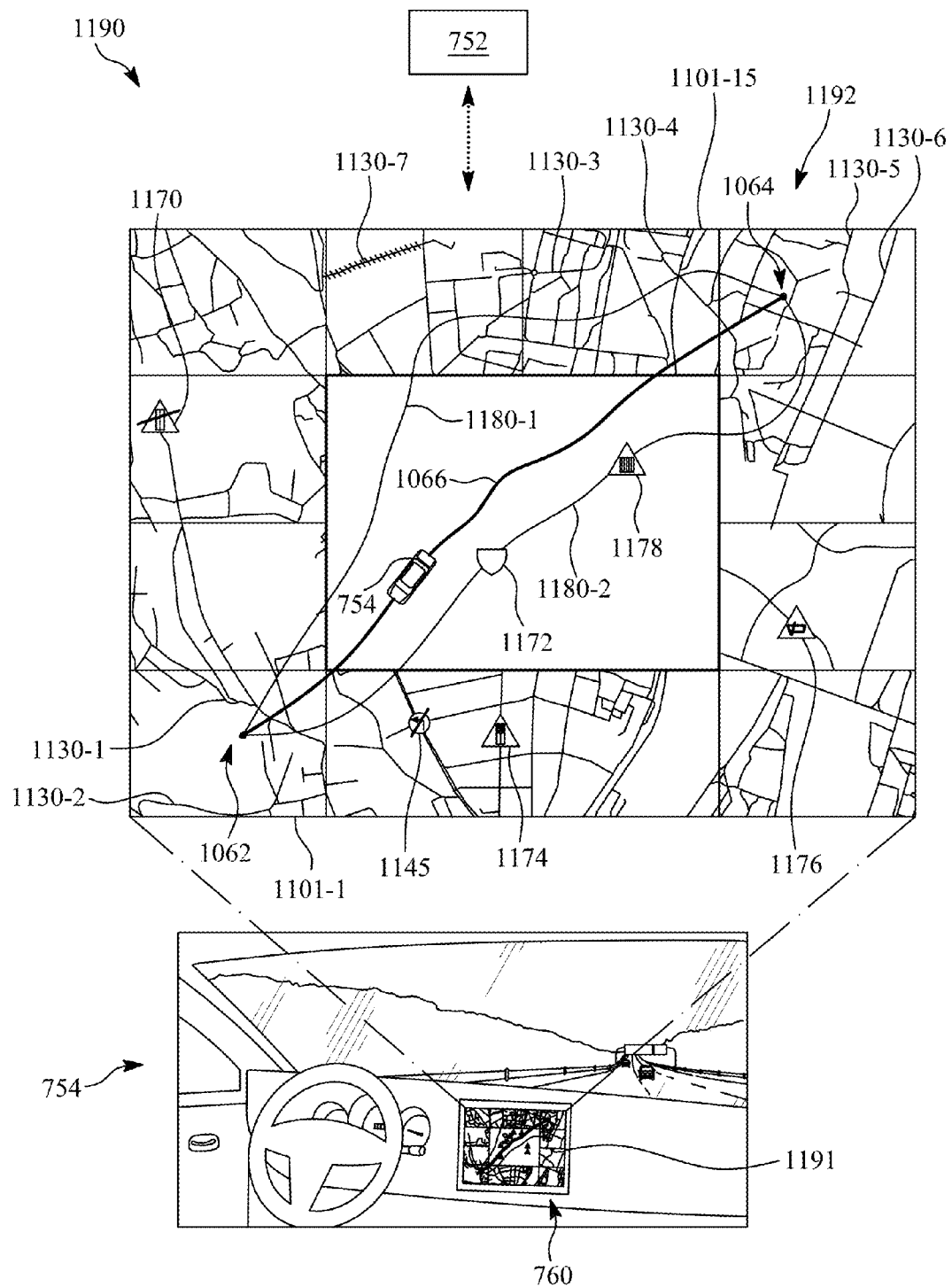
FIG. 11 demonstrates an embodiment 94 of a user interface of the software program product, in accordance with the invention as a screen shot diagram.

FIG. 11 demonstrates an embodiment 94 of a user interface 1190 of the software program product, in accordance with the invention as a screen shot diagram. In an example, the user interface 1190 is displayed on the display screen 1191 of the computing device 760 configured in the autonomous vehicle 754. The user interface 1190 of the embodiment 94 relates to an identical or similar system as described in FIG. 8 of the embodiment 80. The cloud server network 752 behind the user interface 1190 could be e.g. embodiment 70 explained with respect to FIG. 7.

As shown in the FIG. 11, the user interface 1190 illustrates a map 1192. The map 1192 comprises a plurality of quads, depicted as quad 1101-x in the FIG. 11. For the sake of brevity, only specific quads from the plurality of quads 1101 have been shown in the following description. In an example, the map 1192 is stored on a cloud server computer, such as the cloud server computer 752. In said example, the cloud server computer 752 is configured to transmit the map 1192 to the autonomous vehicle 754 through a communication network (not shown in the FIG. 11), such as the communication network 756. The autonomous vehicle 754 comprises a software program (not shown in the FIG. 11), such as the software program 800. In an example, the software program facilitates navigation of the autonomous vehicle 754 using the map 1192.

Further, the map 1192 comprises alternative routes 1180-1 and 1180-2 between the points 1062 and 1064. In an example, total lengths, costs, and/or duration of the alternative routes 1180-1 and 1180-2 are calculated by summing lengths, costs, and durations of different types of road sections. For example, road sections 1130-1 and 1130-2 of a base level quad 1101-1 including the point 1062 may be used. Similarly, road sections 1130-3 and 1130-4 crossing at least one quad, for example, a base level quad 1101-15, with no point 1062 or point 1064 and providing a section of the route 1066 from the start point 1062 to the destination point 1064 may be used. Further, road sections 1130-5 and 1130-6 of the base level quad 1101-16 having point 1064 and leading to point 1064 may be used. Based on the aforementioned road section types, the cloud server network 752 may select the alternative route having the shortest route length, smallest route cost and/or shortest route duration. As an example, the alternative route 1180-2 may be selected as the alternative route having the shortest route length, smallest route cost and/or shortest route duration.

In an example, the computation of the route 1066 is based on one or more criteria, such as a turn restriction 1145, a closed road segment 1170, an enabled toll road 1172, an enabled unpaved road 1174, an enabled ferry notice 1176, and/or a highway enabled notice 1178.

In an example, when a road 1130-7 is blocked, all non-base level quads comprising the road 1130-7 are loaded. The non-base level quads are pruned in a manner such that the road 1130-7 is removed from the non-base level quads (extended area quads), to save data and bandwidth. Thus, computation load of the cloud server network 752 is reduced.

Any features of embodiment 94 may be readily combined or permuted with any of the other embodiments 10, 15, 20, 25, 30, 40, 50, 60, 63, 66, 70, 80, 90, 91, 92, 93, 95, 96, and/or 97 in accordance with the invention.

Figure 12A:
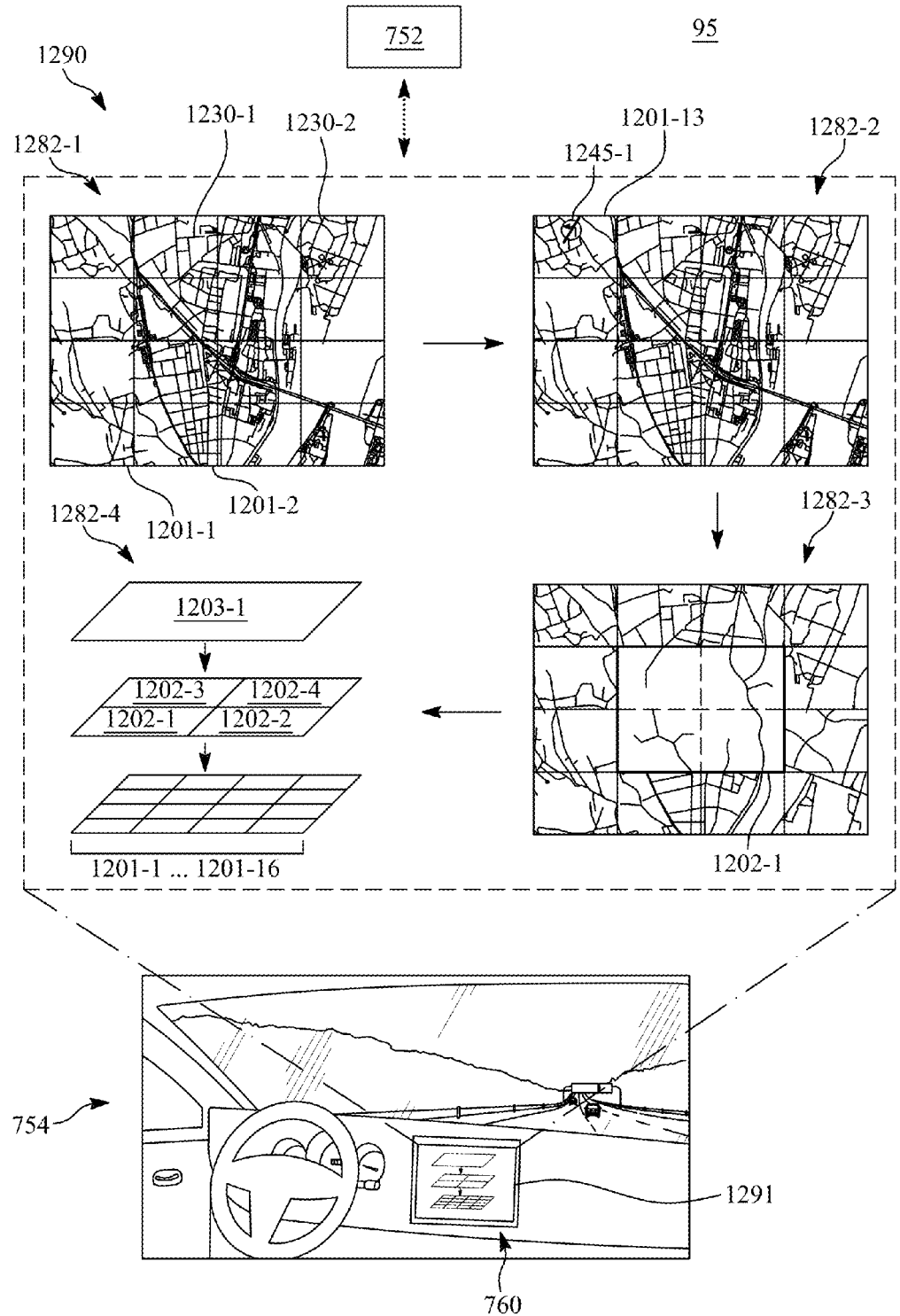
FIG. 12A demonstrates an embodiment 95 of a user interface of the software program product, in accordance with the invention as a screen shot diagram.

FIG. 12A demonstrates an embodiment 95 of a user interface 1290 of the software program product, in accordance with the invention as a screen shot diagram. In an example, the user interface 1290 is displayed on the display screen 1291 of the computing device 760 configured in the autonomous vehicle 754. The user interface 1290 of the embodiment 95 relates to an identical or similar system as described in FIG. 9A of the embodiment 90. The cloud server network 752 behind the user interface 1290 could be e.g. embodiment 70 explained with respect to FIG. 7.

As shown in the FIG. 12A, the user interface 1290 illustrates one or more pre-processing stages 1282-1, 1282-2, 1282-3, and 1282-4. In the stage 1282-1, one or more road segments 1230, individually referred to as a road segment 1230-x are clipped into a plurality of base level quads 1201, individually referred to as 1201-x. For the sake of brevity, only road segments 1230-1 and 1230-2, and base level quads 1201-1 and 1201-2 have been shown in the FIG. 12A. In the stage 1282-2, one or more turn restrictions 1245 are stored in the base level quads. For example, as shown in the FIG. 12A, a turn restriction 1245-1 is stored in a base level quad 1201-13. In the stage 1282-3, a pruning method is performed for generating a higher level extended area quad 1202-1 from the lower level quads. In the stage 1282-4, the pruning method is performed iteratively to generate all higher level extended area quads, such as extended area quads 1202-1 to 1202-4, and extended area quad 1203-1, as shown in the FIG. 12A.

Thus, at the end of pre-processing stage, data related to a map is stored in a plurality of levels, where each level comprises a plurality of quads. Further, pruning of data is done from level to level. Storing of the data in such a data structure facilitates efficient loading of the data, as the higher level quads (more extended area) have less data than the sum of the lower level quads making up the higher level quad.

Any features of embodiment 95 may be readily combined or permuted with any of the other embodiments 10, 15, 20, 25, 30, 40, 50, 60, 63, 66, 70, 80, 90, 91, 92, 93, 94, 96, and/or 97 in accordance with the invention.

Figure 12B:
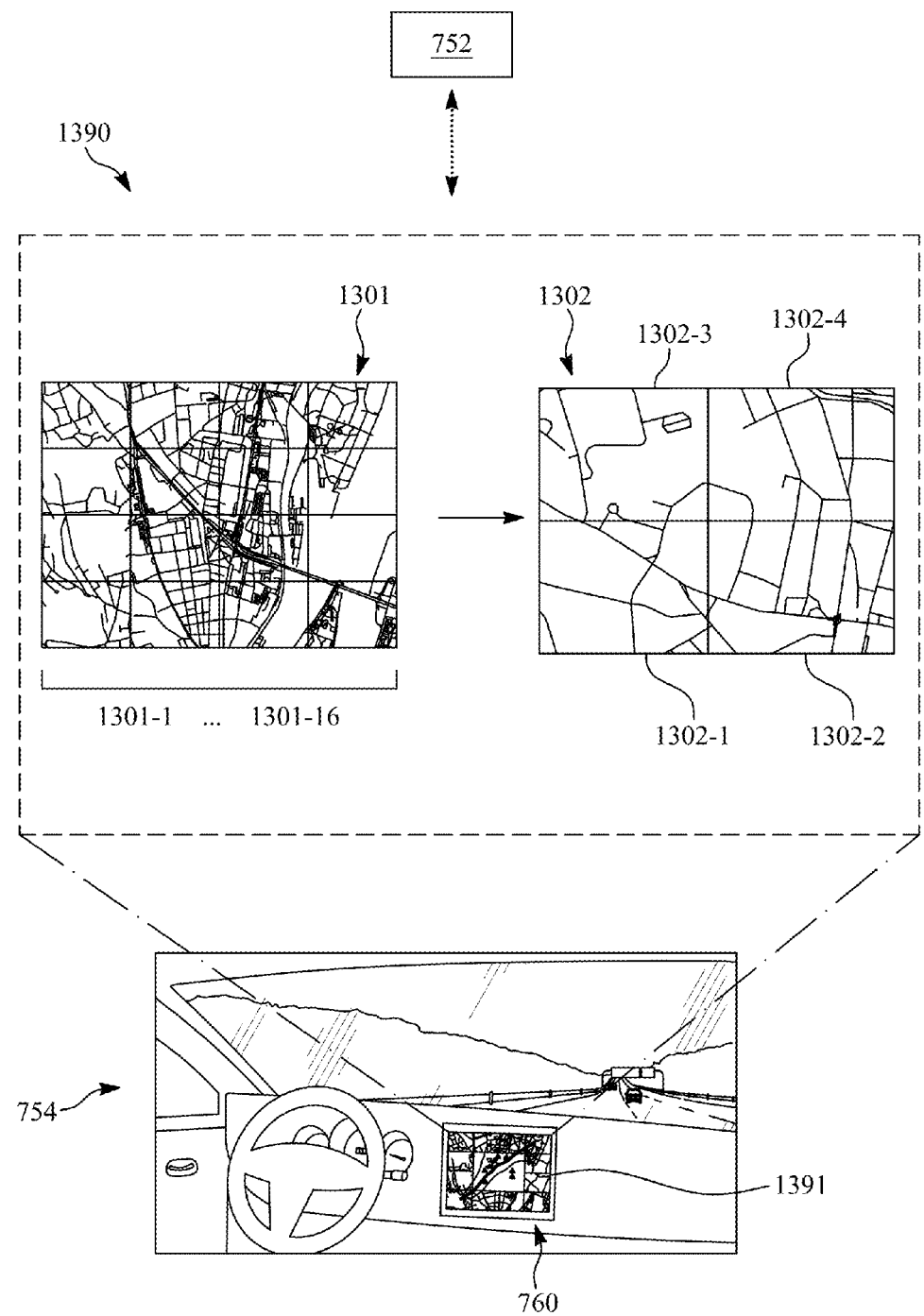
FIG. 12B demonstrates an embodiment 96 of a user interface of the software program product, in accordance with the invention as a screen shot diagram.

FIG. 12B demonstrates an embodiment 96 of a user interface 1390 of the software program product, in accordance with the invention as a screen shot diagram. In an example, the user interface 1390 is displayed on the display screen 1391 of the computing device 760 configured in the autonomous vehicle 754. The user interface 1390 of the embodiment 96 relates to an identical or similar system as described in embodiment 91 of the FIG. 9B. The cloud server network 752 behind the user interface 1390 could be e.g. embodiment 70 explained with respect to FIG. 7.

In an example, the cloud server network 752 calculates a route (not shown in the FIG. 12B) between a start point and a destination point (not shown in the FIG. 12B) by searching through all the quads of a base level 1301 including a plurality of base level quads 1301-1 to 1301-16. In said example, the cloud server network 752 starts the search at the base level 1301 and goes through all the base level quads 1301-1 to 1301-16.

In an implementation, the cloud server network 752 may utilize a plurality of higher level quads 1302-1 to 1302-4 for calculating the route. The plurality of higher level quads 1302-1 to 1302-4 are also referred to as extended area quads 1302-1 to 1302-4 of a quad of a level 1302, which is a level immediately above the base level 1301. In an implementation, when the cloud server network 752 reaches a border of an extended area quad which is far enough from the start point and the destination point, at least one of the higher level quads 1302-1 to 1302-4 is used. In an example, the cloud server network 752 repeats the process for all such higher level quads.

Any features of embodiment 96 may be readily combined or permuted with any of the other embodiments 10, 15, 20, 25, 30, 40, 50, 60, 63, 66, 70, 80, 90, 91, 92, 93, 94, 95, and/or 97 in accordance with the invention.

Figure 12C:
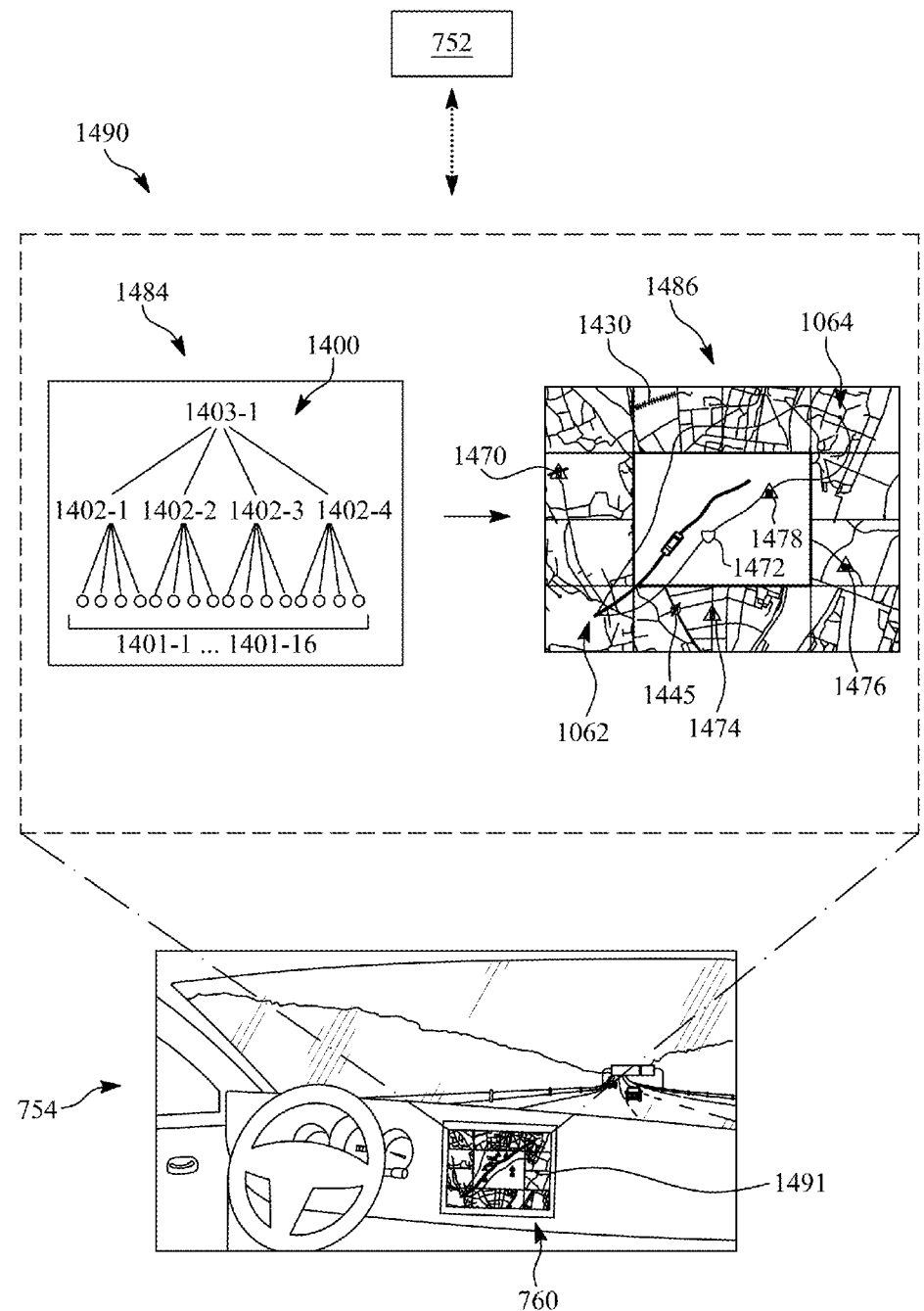
FIG. 12C demonstrates an embodiment 97 of a user interface of the software program product, in accordance with the invention as a screen shot diagram.

FIG. 12C demonstrates an embodiment 97 of a user interface 1490 of the software program product, in accordance with the invention as a screen shot diagram. In an example, the user interface 1490 is displayed on the display screen 1491 of the computing device 760 configured in the autonomous vehicle 754. The user interface 1490 of the embodiment 97 relates to an identical or similar system as described in FIG. 9C of the embodiment 92. The cloud server network 752 behind the user interface 1090 could be e.g. embodiment 70 explained with respect to FIG. 7.

In an example, the cloud server network 752 is configured to compute an optimum route (not shown in the FIG. 12C) based on at least one or more criteria. As shown in the FIG. 12C, the user interface 1490 illustrates various stages of the computation performed by the cloud server network 752 for computing the optimum route. As shown in the FIG. 12C, in a stage 1484, a quad tree hierarchy of a data structure 1400 comprising a plurality of quads 1401-1 to 1401-16, quads 1402-1 to 1402-4, and quads 1403-1 is loaded on demand by the cloud server network 752. In an example, for computing the route, the cloud server network 752 recognizes the predecessors of links instead of nodes.

In a stage 1486, the cloud server network 752 is configured to check one or more turn restrictions 1410 when the cloud server network 752 is extending the set of already travelled links with a new link. Further, blocked roads, such as the road 1430 are excluded from the search. Furthermore, road segments which do not fit one or more criteria, such as toll roads enabled 1445, a closed road segment 1470 unpaved roads enabled 1472, ferries enabled 1474, and/or highways enabled 1476 are also excluded. Subsequently, in the stage 1486, the cloud server network 752 calculates the distance of the currently added link from the start link based on the aforementioned criteria.

By performing the aforementioned functions, the cloud server network 752 computes the optimum route between the start point 1062 and the destination point 1064.

Any features of embodiment 97 may be readily combined or permuted with any of the other embodiments 10, 15, 20, 25, 30, 40, 50, 60, 63, 70, 80, 90, 91, 92, 93, 94, 95, and/or 96 in accordance with the invention.

It should be noted that while the invention has been described based on a quad architecture with an area ratio of four between the levels, this ratio could be selected as some other number in accordance with the invention. For example ratios of 2, 3, 5, 6, 7, 8, 9 and/or 10 or more are possible and in accordance with the invention.

The invention has been explained in the aforementioned and sizable advantages have been demonstrated. The inventions results in efficient loading of data used for facilitating navigation of autonomous vehicles. For instance, when the autonomous vehicle is in a region which is its start point or its destination point, detailed information related to the region, for instance, details of road segments, road blocks, turn restrictions, and the like, are received. However, when the autonomous vehicle is sufficiently far from the start point or the destination point, high level quads having less information is received. The high level quads include road routes which are used for cross routing. Thus, as can be seen, efficient loading of data related to a route being traversed by the autonomous vehicle occurs.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

WO2016051316 A1, TRANSMITTING MAP DATA IMAGES IN A LIMITED BANDWIDTH ENVIRONMENT, published on 7 Apr. 2016, Sunil Kumar Chintakindi, Anatoly Belkin.

The invention claimed is:

1. An electronic route navigation method used in navigating an autonomous vehicle in a road network, comprising:
    applying a map in which a preprocessing stage has been carried out, the map being stored in a form of a base level and one or more higher levels on at least one computer, the preprocessing stage comprising the following phases:
        clipping the base level of the map with road segments of the road network into base level quads;
        storing turn restrictions in the base level quads;
        generating an extended area quad of a higher level by a pruning method from quads of a lower level, keeping unrestricted cross routes for the higher level extended area quad, where an extended area quad is defined to contain an area of a plurality of base level quads;
        generating, using the pruning method, all higher level quads from already existing lower level quads; and
    calculating a route along a road from a start point A to a destination point B, wherein
        the point A is contained in a first base level quad and the point B is contained in a second base level quad,
        one or more extended area quads on said map that do not contain the point A or the point B are used for cross routing, and in said cross routing only road routes crossing said one or more extended area quads, and leading from the point A to the point B are calculated.

2. The method as claimed in claim 1, wherein
total lengths, costs and/or durations of alternative routes from the point A to the point B are calculated by summing lengths, costs and/or durations of any of the following road sections;
road sections of a base level quad containing the point A,
road sections crossing at least one quad that does not contain the point A or the point B and providing a section of a route from the point A to the point B,
road sections of a base level quad leading to the point B, and
a route having a shortest route length, smallest route cost and/or shortest route duration of said alternative routes is selected based on total lengths, costs and/or durations of said alternative routes.

3. The method as claimed in claim 1, wherein the map is configured to be stored on a cloud server computer, and at least one base level quad and/or extended area quad is configured to be sent via a communication network to the autonomous car configured with a software program using said at least one quad for navigation.

4. The method as claimed in claim 1, wherein there is a hierarchical relation between base level quads and extended area quads, for example a relation like: (extended area quad level n)=$4^n$*(base level quad).

5. The method as claimed in claim 4, wherein
n=2 or more levels,
every level covers the same area,
every extended area quad is called a quad of a certain level, and can have a maximum of four child quads on the level below and the size of the quad is four times larger than the child quad,
the lowest level of the hierarchy is called base level, and the base level contains the detailed road network in base level quads,
every level contains less information than the level underneath.

6. The method as claimed in claim 1, wherein route calculation is influenced by any of the following criteria: turn restrictions, closed road segments, toll roads enabled, unpaved roads enabled, ferries enabled and/or highways enabled.

7. The method as claimed in claim 1, wherein
starting from a base level quad, a search for routes from the point A to the point B goes through quad borders,
when a border of a higher level quad (n=1) is reached far enough from the start point A and the destination point B, the higher level quad is used, and/or
when a border of an even higher level quad is reached far enough from the start point A and the destination point B, the even higher level quad (n=2) is used, and so on.

8. The method as claimed in claim 1 involving an edge labelling Dijkstra's algorithm used in computing an optimum route in a memory medium of an autonomous vehicle and/or network server for controlling the navigation of the autonomous vehicle, which may involve any of the following functions:
loading quads from the quad tree hierarchy on demand,
recognizing the predecessors of links instead of nodes,
checking the turn restrictions when extending the set of already travelled links with a new one,
excluding blocked roads from the search,
excluding the roads which don't fit to the criteria,
calculating the distance of the currently added link from the start link according to the criteria.

9. The method as claimed in claim 1, wherein
a road in the map is blocked,
in response to a blocked road all non-base level quads having the blocked road are invalidated.

10. An electronic route navigation system used in navigating an autonomous vehicle in a road network, comprising:
a map is applied in the system in which a preprocessing stage has been carried out, the map being stored in a form of a base level and one or more higher levels on at least one computer, the preprocessing stage comprising the following phases:
the base level of the map with road segments of the road network is clipped into base level quads;
turn restrictions are stored in the base level quads;
an extended area quad of a higher level is generated by a pruning methods from quads of a lower level, keeping unrestricted cross routes for the higher level extended area quad, where an extended area quad is defined to contain an area of a plurality of base level quads;
the pruning method generates all higher level quads from already existing lower level quads; and
a route along a road is configured to be calculated from a start point A to a destination point B, wherein
the point A is contained in a first base level quad and the point B is contained in a second base level quad,
one or more extended area quads on said map that do not contain the point A or the point B are used for cross routing, and in said cross routing only road routes crossing said one or more extended area quads, and leading from the point A to the point B are configured to be calculated.

11. The system as claimed in claim 10, wherein
total lengths, costs and/or durations of alternative routes from the point A to the point B are configured to be calculated by summing lengths, costs and/or durations of any of the following road sections;
road sections of a base level quad containing the point A,
road sections crossing at least one quad that does not contain the point A or the point B and providing a section of a route from the point A to the point B,
road sections of a base level quad leading to the point B, and
a route having a shortest route length, smallest route cost and/or shortest route duration of said alternative routes is configured to be selected based on total lengths, costs and/or durations of said alternative routes.

12. The system as claimed in claim 10, wherein the map is configured to be stored on a cloud server computer, and at least one base level quad and/or extended area quad is configured to be sent via a communication network to the autonomous car configured with a software program using said at least one quad for navigation.

13. The system as claimed in claim 10, wherein there is a hierarchical relation between base level quads and extended area quads, for example a relation like: (extended area quad level n)=$4^n$*(base level quad).

14. The system as claimed in claim 13, wherein
n=2 or more levels,
every level covers the same area,
every extended area quad is called a quad of a certain level, and can have a maximum of four child quads on the level below and the size of the quad is four times larger than the child quad,
the lowest level of the hierarchy is called base level, and the base level contains the detailed road network in base level quads, every level contains less information than the level underneath.

15. The system as claimed in claim 10, wherein route calculation is configured to be influenced by any of the following criteria: turn restrictions, closed road segments, toll roads enabled, unpaved roads enabled, ferries enabled and/or highways enabled.

16. The system as claimed in claim 10, wherein
starting from a base level quad, a search for routes from the point A to the point B is configured to go through quad borders,
when a border of a higher level quad (n=1) is reached far enough from the start point A and the destination point B, the higher level quad is configured to be used, and/or
when a border of an even higher level quad is reached far enough from the start point A and the destination point B, the even higher level quad (n=2) is configured to be used, and so on.

17. The system as claimed in claim 10 involving an edge labelling Dijkstra's algorithm used in computing an optimum route in a memory medium of an autonomous vehicle and/or network server for controlling the navigation of the autonomous vehicle, which system may be configured to involve any of the following functions:
loading quads from the quad tree hierarchy on demand,
recognizing the predecessors of links instead of nodes,
checking the turn restrictions when extending the set of already travelled links with a new one,
excluding blocked roads from the search,
excluding the roads which don't fit to the criteria,
calculating the distance of the currently added link from the start link according to the criteria.

18. The system as claimed in claim 10, wherein
a road in the map is configured as blocked,
in response to a blocked road all non-base level quads having the blocked road are configured to be invalidated.

19. An electronic route navigation program product embodied in a non-transitory storage medium, used in navigating an autonomous vehicle in a road network, comprising:
a map is applied in the program in which a preprocessing stage has been carried out, the map being stored in a form of a base level and one or more higher levels on at least one computer, the preprocessing stage comprising the following phases:
the base level of the map with road segments of the road network is clipped into base level quads;
turn restrictions are stored in the base level quads;
an extended area quad of a higher level is generated by a pruning methods from quads of a lower level, keeping unrestricted cross routes for the higher level extended area quad, where an extended area quad is defined to contain an area of a plurality of base level quads;
the pruning method generates all higher level quads from already existing lower level quads; and
a route along a road is configured to be calculated from a start point A to a destination point B, wherein
the point A is contained in a first base level quad and the point B is contained in a second base level quad,
one or more extended area quads on said map that do not contain the point A or the point B are used for cross routing, and in said cross routing only road routes crossing said one or more extended area quads, and leading from the point A to the point B are configured to be calculated.

20. The program product as claimed in claim 19, wherein
total lengths, costs and/or durations of alternative routes from the point A to the point B are calculated by summing lengths, costs and/or durations of any of the following road sections;
road sections of a base level quad containing the point A,
road sections crossing at least one quad that do not contain the point A or the point B and providing a section of a route from the point A to the point B,
road sections of a base level quad leading to the point B, and
a routed having a shortest route length, smallest route cost and/or shortest route duration of said alternative routes is selected, based on total lengths, costs and/or durations of said alternative routes.

21. The program product as claimed in claim 19, wherein the map is configured to be stored on a cloud server computer, and at least one base level quad and/or extended area quad is configured to be sent via a communication network to the autonomous car configured with a software program using said at least one quad for navigation.

22. The program product as claimed in claim 19, wherein there is a hierarchical relation between base level quads and extended area quads, for example a relation like: (extended area quad level n)=4n*(base level quad).

23. The program product as claimed in claim 19, wherein route calculation is influenced by any of the following criteria: turn restrictions, closed road segments, toll roads enabled, unpaved roads enabled, ferries enabled and/or highways enabled.

24. The program product as claimed in claim 22, wherein:
n=2 or more levels,
every level covers the same area,
every extended area quad is called a quad of a certain level, and can have a maximum of four child quads on the level below and the size of the quad is four times larger than the child quad,
the lowest level of the hierarchy is called base level, and the base level contains the detailed road network in base level quads,
every level contains less information than the level underneath.

25. The program product as claimed in claim 19, wherein
start starting from a base level quad, a search for routes to the point A and the point B goes through quad borders,
when a border of a higher level quad (n=1) is reached far enough from the start point A and the destination point B, the higher level quad is used, and/or
when a border of an even higher level quad is reached far enough from the start point A and the destination point B, the even higher level quad (n=2) is used, and so on.

26. The program product as claimed in claim 19 involving an edge labelling Dijkstra's algorithm used in computing an optimum route in a memory medium of an autonomous vehicle and/or network server for controlling the navigation of the autonomous vehicle, which may involve any of the following functions:
loading quads from the quad tree hierarchy on demand,
recognizing the predecessors of links instead of nodes,
checking the turn restrictions when extending the set of already travelled links with a new one,
excluding blocked roads from the search,
excluding the roads which don't fit to the criteria,
calculating the distance of the currently added link from the start link according to the criteria.

27. The program product as claimed in claim 19, wherein a road in the map is blocked, in response to a blocked road all non-base level quads having the blocked road are invalidated.

* * * * *